(12) United States Patent
Sakaue et al.

(10) Patent No.: US 7,947,353 B2
(45) Date of Patent: May 24, 2011

(54) INFORMATION RECORDING MEDIUM AND ITS PRODUCTION PROCESS

(75) Inventors: Yoshitaka Sakaue, Osaka (JP); Takashi Nishihara, Osaka (JP); Rie Kojima, Osaka (JP); Akio Tsuchino, Osaka (JP)

(73) Assignee: Panasonic Corporation, Osaka (JP)

( * ) Notice: Subject to any disclaimer, the term of this patent is extended or adjusted under 35 U.S.C. 154(b) by 671 days.

(21) Appl. No.: 11/997,114

(22) PCT Filed: Jul. 6, 2006

(86) PCT No.: PCT/JP2006/313474
§ 371 (c)(1),
(2), (4) Date: Jan. 28, 2008

(87) PCT Pub. No.: WO2007/013276
PCT Pub. Date: Feb. 1, 2007

(65) Prior Publication Data
US 2010/0151178 A1  Jun. 17, 2010

(30) Foreign Application Priority Data

Jul. 29, 2005 (JP) ................................. 2005-219954

(51) Int. Cl.
*B32B 3/02* (2006.01)
(52) U.S. Cl. ................. 428/64.1; 428/64.4; 428/64.5; 428/64.6; 430/270.13
(58) Field of Classification Search .................. None
See application file for complete search history.

(56) References Cited

U.S. PATENT DOCUMENTS

2004/0001418 A1* 1/2004 Shinotsuka et al. .......... 369/111
2004/0202097 A1  10/2004 Oyake et al.
2006/0228531 A1  10/2006 Iwasa et al.
2007/0009703 A1   1/2007 Shinkai et al.

FOREIGN PATENT DOCUMENTS

| JP | 2001-266402 | 9/2001 |
|---|---|---|
| JP | 2002-298433 | 10/2002 |
| JP | 2004-265540 | 9/2004 |
| JP | 2004-327016 | 11/2004 |
| JP | 2005-81795 | 3/2005 |
| JP | 2005-122872 | 5/2005 |
| JP | 2005-302264 | 10/2005 |

OTHER PUBLICATIONS

International Search Report issued Oct. 10, 2006 in the International (PCT) Application of which the present application is the U.S. National Stage.
International Symposium Optical Memory (ISOM 2000), "Rewritable Dual-Layer Phase-Change Optical Disk Utilizing Blue-Violet Laser", Technical Digest, pp. 16-17.

* cited by examiner

*Primary Examiner* — Elizabeth Mulvaney
(74) *Attorney, Agent, or Firm* — Wenderoth, Lind & Ponack, L.L.P.

(57) ABSTRACT

In each of at least two information layers (1, 2) which constitute a information recording medium having a plurality of information layers on its one side, the compositions of the recording layer (7) and the dielectric layers (6, 8) adjacent to the recording layer (7) in one information layer (1) are common to the compositions of the corresponding layers (12, 11, 13) in the other information layer, so that the recording layers (7, 12) and the dielectric layers (6, 11) and (8, 13) in the two information layers (1, 2) can be formed in common sputtering film-forming chambers without the replacement of targets, which makes it possible to produce a multi-layer single-sided recording medium with a decreased time loss in the production process.

16 Claims, 4 Drawing Sheets

INFORMATION RECORDING MEDIUM AND ITS PRODUCTION PROCESS

BACKGROUND OF THE INVENTION

1. Technical Field

The present invention relates to a information recording medium (hereinafter optionally referred to as "a recording medium") for recording information thereon at a higher speed and at a higher density and reproducing the information therefrom, and to a process for producing the same.

2. Description of Related Art

The present inventors have developed 4.7 GB/DVD-RAM and a single-layer single-sided 25 GB (1-fold speed)/Blu-ray disc, as disc-shaped phase-change information recording media of a large capacity (hereinafter optionally referred to as "optical disc") on and from which information is recorded and reproduced with a laser beam. These recording media can be used as data files or image files. The inventors have further developed a double-layer single-sided 50 GB (1-fold time speed)/Blu-ray disc (having two information layers at its one side) in order to increase the recording capacity of the optical disc. These discs already have been commercialized.

As the recording modes of these DVD-RAM and Blu-ray discs, phase-change recording modes are employed. This recording mode takes an advantage of the property of a recording layer's irreversible change in its state between an amorphous phase and a crystal phase (or between a crystal phase and another crystal phase having a different structure) when being irradiated with a laser beam. This is described in detail. Information is recorded by irradiating a recording layer with a laser beam to cause change of at least one of its refractive index and extinction coefficient, so that a recording mark is formed thereon. Once the recording mark has been formed, light which is emitted and transmits or reflects on the recording layer differs in its amplitude between the recording mark and other surrounding portion of the recording layer. Information (or a signal) is reproduced by detecting such a difference.

It is generally known that no information is recorded on a recording layer when the material of the recording layer is in a crystalline state. A signal is recorded on the recording layer when the recording layer is put in an amorphous state after the material of the recording layer is melted by exposure to a laser beam and is then quenched to be amorphous. The deletion of the signal is done by exposing the recording layer to a laser beam with power lower than that for the recording, and putting the recording layer in the crystalline state.

Generally, a phase-change type optical disc includes a dielectric layer, a recording layer and a reflective layer, which are formed in this order on a substrate. As an example of the structure of such a disc, a first dielectric layer, a recording layer, a second dielectric layer and a reflective layer are deposited in this order on a substrate. Hereinafter, the functions of the respective layers are described. The dielectric layer includes a dielectric material and has a function to protect the recording layer from an external mechanical damage, a function to utilize an interference effect by multiple reflection to emphasize an optical change, a function to shut out an influence from an external air to thereby prevent the chemical change of the recording layer, and a function to reduce the surface roughening of the substrate and the thermal damage of the recording layer due to the repeated recording of signals. The dielectric layer is therefore sometimes called a protective layer.

When the dielectric layer consists of two layers, one layer of the dielectric layer in contact with a recording layer (this layer being also called an interface layer) is able to vary the state-changing speed of the recording layer between a crystalline state and an amorphous state, by appropriately selecting the composition of this dielectric layer. Therefore, the dielectric layer in contact with the recording layer also has an important function to control the crystallization speed of the recording layer.

As described above, the recording layer absorbs a laser beam and changes its own phase. Information is mainly recorded on this layer. When information is recorded or deleted, the reflective layer functions to absorb heat from the recording layer which has absorbed the laser beam and has a higher temperature, and to release the heat.

The properties of each of the layers change depending on not only the composition of its material but also its thickness. That is, layers which are common in the compositions of their materials and which differ in thickness from each other show different properties. For example, when the thickness of the reflective layer is increased, it becomes possible to efficiently release heat which the recording layer has absorbed when information has been recorded on the recording layer. As a result, an amorphous portion is easily formed in the recording layer so that the quality of the signal is improved.

An information recording medium having multiple layers on its one side, typified by a double-layer single-sided optical disc such as the above-described double-layer single-sided Blu-ray disc, has a configuration wherein, as shown in FIG. 2, a first information layer 21, a second information layer 22, a third information layer 23, . . . , and a n-th information layer n are deposited in this order on a substrate 20. These information layers are optically separated from one another by transparent optically separating layers formed of a UV curable resin; and a cover layer 28 (or a light-transmitting layer) formed of a UV curable resin is provided on the n-th information layer. Recording or reproducing data on or from each of the information layers is made by causing a laser beam 29 to come into the disc from the side of the cover layer 28.

One of the properties required for the multi-layer single-sided recording medium is that the information layers near the laser beam-incoming side should have higher transmittance. For example, in case of a double-layer single-sided recording medium (i.e. a recording medium having two information layers on its one side), information is recorded on or reproduced from one of the information layers on the rear side (or distant from a laser beam (or a laser beam source)) (this layer being referred to as "a first information layer") by using a laser beam which transmits the other information layer near the laser beam-incoming side (this layer being referred to as "a second information layer"). Therefore, laser power needed to record the information on the first information layer is represented by a value calculated as follows: laser power needed to record the information on a recording medium having only the first information layer is divided by the transmittance of the second information layer. In other words, the medium having two information layers requires more laser power to record or reproduce information. Further, in the medium having two information layers, the second information layer is needed to have a higher transmittance (for example, 50%), while the first information layer is needed to have a higher reflectance.

The present inventors studied the following technique: that is, in an information layer which has at least a recording layer and a reflective layer in this order from a laser beam-incoming side, a transmittance-adjusting layer formed of a dielectric material is provided in contact with one side of the reflective layer which is opposite the laser beam-incoming side of the reflective layer. Further, the inventors optimized the refractive indexes and the extinction coefficients of the transmittance-adjusting layer and the reflective layer. As a result, it becomes possible to increase the transmittance of the first information layer. Further, there is an approach to decrease the thickness of laser beam-absorbing layers (i.e. the recording layer and the reflective layer) so as to increase the transmittance of the first information layer.

Herein, examples of the recording media each having two information layers on its one side reported so far are described. JP-A-2001-266402 discloses a double-layer single-sided optical disc, wherein the first information layer includes layers of AlCr/ZnS—$SiO_2$/GeSbTe/ZnS—$SiO_2$ deposited in this order from the side near to a substrate on which the layers are formed (i.e. a substrate attached to a film-forming apparatus), and wherein the second information layer includes layers of ZnS—$SiO_2$/InSbTe/ZnS—$SiO_2$. In this regard, the slash "/" means the lamination, and the dash "-" means the mixing of the substances. In the recording medium disclosed in this Publication, the two information layers have recording layers of which the compositions are different from each other.

JP-A-2002-298433 discloses a double-layer single-sided optical recording medium, wherein the first information layer includes SiC (a transparent heat-releasing layer)/Au (a reflective layer)/ZnS—$SiO_2$ (a dielectric layer)/GeN (a crystallization-accelerating layer)/$Ge_5Sb_{76}Te_{19}$ (a recording layer)/GeN (a crystallization-accelerating layer)/ZnS—$SiO_2$ (a dielectric layer), and wherein the second information layer includes an Ag alloy (a reflective layer)/ZnS—$SiO_2$ (a dielectric layer)/GeSiN (a crystallization-accelerating layer)/$Ge_2Sb_2Te_5$ (a recording layer)/GeSiN(a crystallization-accelerating layer)/ZnS—$SiO_2$ (a dielectric layer). In the recording medium disclosed in this Publication, the reflective layer, the recording layer and the crystallization-accelerating layer in contact with the recording layer in the first information layer are different in their compositions from those in the second information layer.

International Symposium Optical Memory (ISOM 2000), Technical Digest, pp 16-17, discloses one model of double-layer single-sided optical disc developed by the present applicant (i.e. the assignee in the U.S.A). In this optical disc having two information layers on its one side, the first information layer includes an Al alloy (a reflective layer)/ZnS—$SiO_2$ (a protective layer)/GeN (an interface layer)/GeSbTe (a recording layer)/GeN (an interface layer)/ZnS—$SiO_2$ (a protective layer); and the second information layer includes an Ag alloy (a reflective layer)/ZnS—$SiO_2$ (a protective layer)/GeN (an interface layer)/GeSbTeSn (a recording layer)/GeN (an interface layer)/ZnS—$SiO_2$ (an interface layer). In this optical disc, the recording layer and the reflective layer in the first information layer are different in their compositions from those in the second information layer.

In any of the double-layer single-sided recording media disclosed in the above Publications, one layer or a plural number of layers, out of the layers constituting one information layer, is/are different in the composition(s) from the corresponding layer(s) in the other information layer. This is because the properties required for the second information layer are different from the properties required for the first information layer, as mentioned above.

JP-A-2005-122872 discloses, in Example 1, a double-layer phase-change type information recording medium, wherein the first information layer includes Al—Ti (a reflective layer)/ZnS—$SiO_2$ (a protective layer)/$Ge_5Ag_1In_2Sb_{70}Te_{22}$ (a recording layer)/ZnS—$SiO_2$ (a protective layer); and the second information layer comprises $In_2O_3$—ZnO (a heat diffusing layer)/Ag—Zn—Al (a reflective layer)/ZnS—$SiO_2$ (a protective layer)/$Ge_5Ag_1In_2Sb_{70}Te_{22}$ (a recording layer)/ZnS—$SiO_2$ (a protective layer)/$In_2O_3$—ZnO (a heat-diffusing layer). In the recording medium disclosed in this Publication, the recording layer in the first information layer is the same as that in the second information layer, and each of the recording layers in both the information layers is laid between the ZnS—$SiO_2$ layers. In this disc, the compositions of the reflective layers in the first information layer and the second information layer are different from each other, while the compositions of the recording layer and the protective layers in the first information layer are the same as those in the second information layer. In this point, this disc differs from the media disclosed in the former three Publications.

SUMMARY OF THE INVENTION

In formation of a recording layer, a reflective layer, a dielectric layer and other thin layers (e.g. a transmittance-adjusting layer, etc.) of a information recording medium by the sputtering process, a cluster type sputtering apparatus is often employed because of its good mass productivity. FIG. 3 shows a schematic plan view of the cluster type sputtering apparatus. In this apparatus, sputtering is performed in film-forming chambers 32 to 38. When one substrate is rounded through the film-forming chambers 32 to 38 once, seven layers are formed on the substrate. The substrate is introduced into a vacuum chamber (a main chamber 31) and is then conveyed to the film-forming chamber (32 or 38) through a load lock chamber 30. When one substrate is subjected to sputtering in each of the film-forming chambers and is then conveyed to the next film-forming chamber, another substrate is fed to the former film-forming chamber.

Where a double-layer single-sided recording medium is manufactured, using the cluster type sputtering apparatus, a first information layer is formed by rounding a substrate through a plurality of film-forming chambers once, and then, a second information layer is formed by further rounding the substrate through the same film-forming chambers once. In this case, prior to the formation of the second information layer, it is needed to replace the target in a certain film-forming chamber in which a layer having a composition different from the composition of a layer in the first information layer is to be formed. A recording medium having three or more information layers on its one side also can be manufactured in the same manner. Accordingly, the target of the film-forming chamber for forming the recording layer is needed to be replaced, when the composition of the recording layer in the first information layer is different from that of the recording layer in the second information layer.

This method has an advantage in that a recording medium having a plurality of information layers on its one side can be produced, using a single relatively small sputtering apparatus, however, has the following problems because of the need to replace the targets:

(1) the operation rate lowers because of the interruption of production during the replacement of the target, and (2) there remains a trace of residual moisture which can not be entirely exhausted by the evacuation of the film-forming chamber because of the opening of the film-forming chamber for the replacement of the target. This moisture further gives adverse influence on not only the film-forming chamber in which the target is replaced, but also other film-forming chambers connected through the main chamber. The moisture remaining in the film-forming chamber, even if a very little, significantly affects the quality of the recording layer which dominantly influences the recording/reproducing characteristics, and the quality of the dielectric layer in contact with the recording layer, resulting in adverse influences on the characteristics of the medium. Furthermore, the influences of such residual moisture become more serious in a medium adapted to high-fold speed play.

Such problems will be avoided, if it is not necessary to replace the target. This is described in detail. For example, one idea for solving the problems is that the film-forming chambers are increased in number so that the layers of one medium, to be formed by sputtering, are formed in separate film-forming chambers. For example, in case where each of the first information layer and the second information layer comprises six layers, the above problem can be avoided by using a sputtering apparatus having twelve film-forming chambers. Otherwise, the cluster type sputtering apparatuses are increased in number so that the respective information layers are formed in the separate apparatuses. However, the alteration of the apparatus or increase in the number of the apparatuses leads to a higher cost for the apparatus(es) and/or a higher production cost.

Or otherwise, a medium is so designed that the respective functional layers (especially recording layers) in all the information layers have common compositions. By doing so, it is possible to avoid the replacement of the targets or to decrease the number of times that the target is replaced. However, such a medium hitherto has not been proposed in any of many publications. This is because, in the double-layer single-sided recording medium, the first information layer and the second information layer are required to have different characteristics from each other, as described above.

In the medium disclosed in JP-A-2005-122872, the compositions of the recording layer and the protective layers in the first information layer are common to those of the recording layer and the protective layers in the second information layer. Therefore, it is supposed that this medium can be more efficiently manufactured, using the cluster type sputtering apparatus, than any of the media disclosed in other publications. However, as a result of the present inventors' tests, it is found that the medium disclosed in this publication shows unsatisfactory characteristics (life characteristics) after the environmental tests thereof.

An object of the present invention is therefore to provide a information recording medium excellent in archival characteristics, wherein, in all the information layers, the compositions of recording layers are common to each other, and the compositions of layers, adjacent to each of the recording layers, are common to each other.

An information recording medium according to the present invention includes at least two information layers having recording layers, respectively, and each of the recording layers can generate an optically detectable phase change. When one of the information layers near to the light incoming side is represented by a, and the other information layer distant therefrom, b, the information layer a includes at least a dielectric layer a1, a recording layer a, a dielectric layer a2 and a reflective layer a in this order from the light incoming side; and the information layer b includes at least a dielectric layer 1b, a recording layer b, a dielectric layer 2b and a reflective layer b in this order from the light incoming side.

The dielectric layers 1a and 2a are in contact with the recording layer a, and the dielectric layers 1b and 2b, are in contact with the recording layer b.

Each of the dielectric layer 1a and the dielectric layer 1b contains at least one atom selected from an oxygen atom, a nitrogen atom and a fluorine atom; and each of the dielectric layer 1a and the dielectric layer 1b contains at least one element selected from Al, Si, Cr, Ta, Mo, W, Zr and Hf, when containing an oxygen atom; each of the dielectric layer 1a and the dielectric layer 1b contains at least one element selected from Al, B, Ge, Si, Ti and Zr, when containing a nitrogen atom; or each of the dielectric layer 1a and the dielectric layer 1b contains at least one element selected from Dy, Er, Eu, Ce, Bi and La, when containing a fluorine atom.

Each of the dielectric layer 2a and the dielectric layer 2b contains at least one element selected from Zr, Si, Cr, In, Ga and Hf, and an oxygen atom.

Also, the composition of the dielectric layer 1a is the same as that of the dielectric layer 1b; the composition of the recording layer a is the same as that of the recording layer b; and the composition of the dielectric layer 2a is the same as that of the dielectric layer 2b.

Because each of the dielectric layers formed in contact with the recording layer in each of the information layers contains specific elements, the information recording medium of the present invention enables excellent information recording and -reproducing and shows sufficient life characteristics, in spite of the fact that the compositions of the recording layers a and b are the same; the compositions of the dielectric layers 1a and 1b are the same; and the compositions of the dielectric layers 2a and 2b are the same, in the two information layers a and b, each including the dielectric layer 1, the recording layer and the dielectric layer 2 in this order from the laser beam-incoming side. Therefore, according to the present invention, a recording medium which includes two or more information layers and which is excellent in recording and reproducing characteristics and life characteristics can be more efficiently manufactured by the sputtering process.

In the information recording medium of the present invention, an oxygen atom, a nitrogen atom or a fluorine atom, contained in each of the dielectric layer 1a and the dielectric layer 1b, generally may be present in the form of an oxide, a nitride or a fluoride. Accordingly, in the information recording medium of the present invention, preferably, each of the dielectric layer 1a and the dielectric layer 1b contains at least one compound selected from the oxides of Al, Si, Cr, Ta, Mo, W, Zr and Hf, the nitrides of Al, B, Ce, Si, Ti and Zr, and the fluorides of Dy, Er, Eu, Ce, Bi and La; and preferably, each of the dielectric layer 2a and the dielectric layer 2b contains at least one compound selected from the oxides of Zr, Si, Cr, In, Ga and Hf.

In the information recording medium of the present invention, preferably, the composition of the reflective layer a is substantially the same as that of the reflective layer b. When the compositions of the reflective layers of the two information layers are the same, the recording medium can be manufactured at a higher efficiency.

In at least one combination selected from the combination of the dielectric layers 1a and 1b, the combination of the recording layers a and b and the combination of the dielectric layers 2a and 2b in the information recording medium of the present invention, it is preferable that the layers differ in thickness from each other. By changing the thickness of the layers, it becomes possible to obtain the information layers a and b which have different optical characteristics from each other, despite the same composition. In this case, the thickness of the recording layer 1a is preferably smaller than the thickness of the recording layer 1b, in order to lessen the absorption of light by the information layer a.

Or otherwise, in the information recording medium of the present invention, the reflective layers a and b having the same compositions may differ in thickness from each other. In this case, the thickness of the reflective layer a is preferably smaller than that of the reflective layer b, in order to lessen the absorption of light by the information layer a.

Preferably, each of the reflective layers a and b contains at least one element selected from Ag, Al and Au, as a main component (in an amount of at least 90 at. %).

The information recording medium of the present invention further may include a dielectric layer 3a formed in contact with the other surface of the dielectric layer 1a which is in contact with the recording layer a at its one surface, and a dielectric layer 3b formed in contact with the other surface of the dielectric layer 1b which is in contact with the recording layer b at its one surface. In this case, preferably, the composition of the dielectric layer 3a is the same as that of the dielectric layer 3b. In the recording medium further including the dielectric layers 3a and 3b, the dielectric layers 1a and 1b may be called interface layers.

In the information recording medium of the present invention, it is preferable that the information layer a further may include a high refractive index layer a, and thus, the dielectric layer 2a, the reflective layer a and the high refractive index layer a are located in this order from the light incoming side, and the refractive indexes of the dielectric layer 1a, the dielectric layer 2a and the high refractive index layer a satisfy the relationships of $n1a < n3a$ and $n2a < n3a$, wherein the refractive index of the dielectric layer 1a is $n1a$; the refractive index of the dielectric layer 2a is $n2a$; and the refractive index of the high refractive index layer a is $n3a$, at the wavelength of light to be used for recording and reproducing. By providing the high refractive index layer, the transmittance of the information layer a is increased, so that the recording/reproducing of information on the information layer b can be more sufficiently performed.

The high refractive index layer preferably contains at least one element selected from Ti and Nb, and either or both of an oxygen atom and a nitrogen atom. In such a high refractive index layer, Ti and Nb are present generally as an oxide and/or a nitride.

In the information recording medium of the present invention, each of the recording layers a and b preferably contains Te and Ge. By using such recording layers with the two dielectric layers 1 and 2 each containing the above specific elements, it is possible to advantageously manufacture the recording medium in which the compositions of the dielectric layers 1a and 1b are the same; the compositions of the recording layers a and b are the same; and the compositions of the dielectric layers 2a and 2b are the same. More preferably, each of the recording layers a and b further contains at least one element selected from In, Bi, Sn, Ag, Sb, Ga and Al.

The present invention is preferably realized as a information recording medium having two information layers. In concrete, the medium having two information layers is embodied as DVD or BD-RE.

Otherwise, the present invention is preferably realized as an information recording medium in which information layers a and b are continuously formed, independently of the number of information layers. Particularly when the information layers a and b are continuously formed, such a information recording medium can be efficiently manufactured, using the cluster type sputtering apparatus, without the need of the replacement of the target, or with a decreased number of times of such replacement.

The present invention further provides a method for producing the information recoding medium according to the present invention. This method for producing the information recording medium includes forming the dielectric layer 1a, the recording layer a and the dielectric layer 2a of the information layer a, and the dielectric layer 1b, the recording layer b and the dielectric layer 2b of the information layer b by any one process selected from the sputtering process, the vapor deposition process and the CVD process; and this process is characterized in that the dielectric layers 1a and 1b are formed using a common target of the same composition, the recording layers a and b are formed using a common target of the same composition, and the dielectric layers 2a and 2b are formed using a common target of the same composition. According to this production method, for example, the dielectric layers 1a and 1b can be formed in a single film-forming chamber, without the replacement of the target; the recording layers a and b can be formed in another common film-forming chamber without the replacement of the target; and the dielectric layers 2a and 2b can be formed in a further common film-forming chamber without the replacement of the target, and thus, the production efficiency can be improved.

In the manufacturing process of the present invention, preferably, the reflective layer a in the information layer a and the reflective layer b in the information layer b are formed using a common target of the same composition. By doing so, the number of times of the replacement of the target can be decreased in the course of production, and thus, the recording medium can be more efficiently produced.

In the foregoing descriptions, the term "the same composition" relative to the layers means "substantially the same composition", which includes the meaning of perfectly the same composition and additionally, the meaning of a slightly different composition because of analyzing precision (i.e. an error) and traces of impurities contained during the film-forming operation. The analyzing precision tends to lower, since the respective layers constituting the information recording medium are so very thin as several tens nm or less. For this reason, the wording "the compositions of the layers are the same" used in the present specification means that the difference of each of the components is within a range of the analyzing precision, when the components in thin layers are measured. Particularly, this wording means that the difference of each of the components is preferably 0.7 atomic % or less, when the components are expressed in atomic %; or this wording means that the difference of each of the components is 4 mol % or less, when the components are expressed in mol %.

The information recording medium of the present invention includes at least two information layers each of which has a lamination structure including a dielectric layer 1/a recording layer/a dielectric layer 2. In the two information layers a and b, the compositions of the two dielectric layers 1a and 1b are the same; the compositions of the two recording layers a and b are the same; and the compositions of the two dielectric layers 2a and 2b are the same. Despite the above arrangement, the recording medium of the present invention shows excellent recording and reproducing characteristics and excellent life characteristics. Therefore, the present invention makes it possible to realize a multi-layer single-sided information recording medium excellent in productivity. In addition, the production method of the present invention makes it possible to efficiently produce such a recording medium, by employing the sputtering process or the like, without the need to replace a target or with a decreased number of times of such replacement.

DESCRIPTION OF REFERENCE NUMERALS

Figure 1:
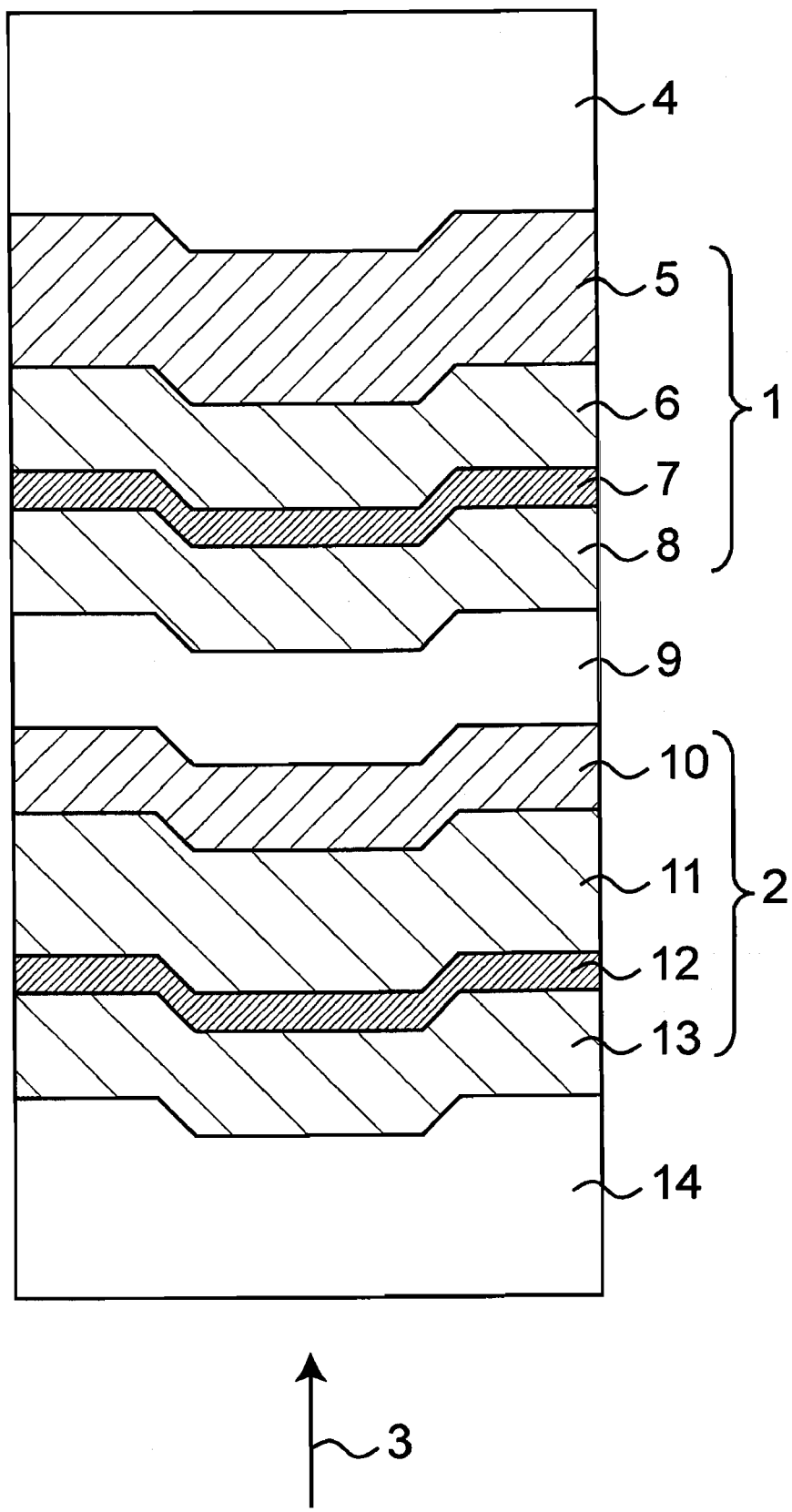
FIG. 1 shows a partial cross-section of a recording medium (an optical disc) according to an embodiment of the present invention, illustrating the structure thereof.
Figure 2:
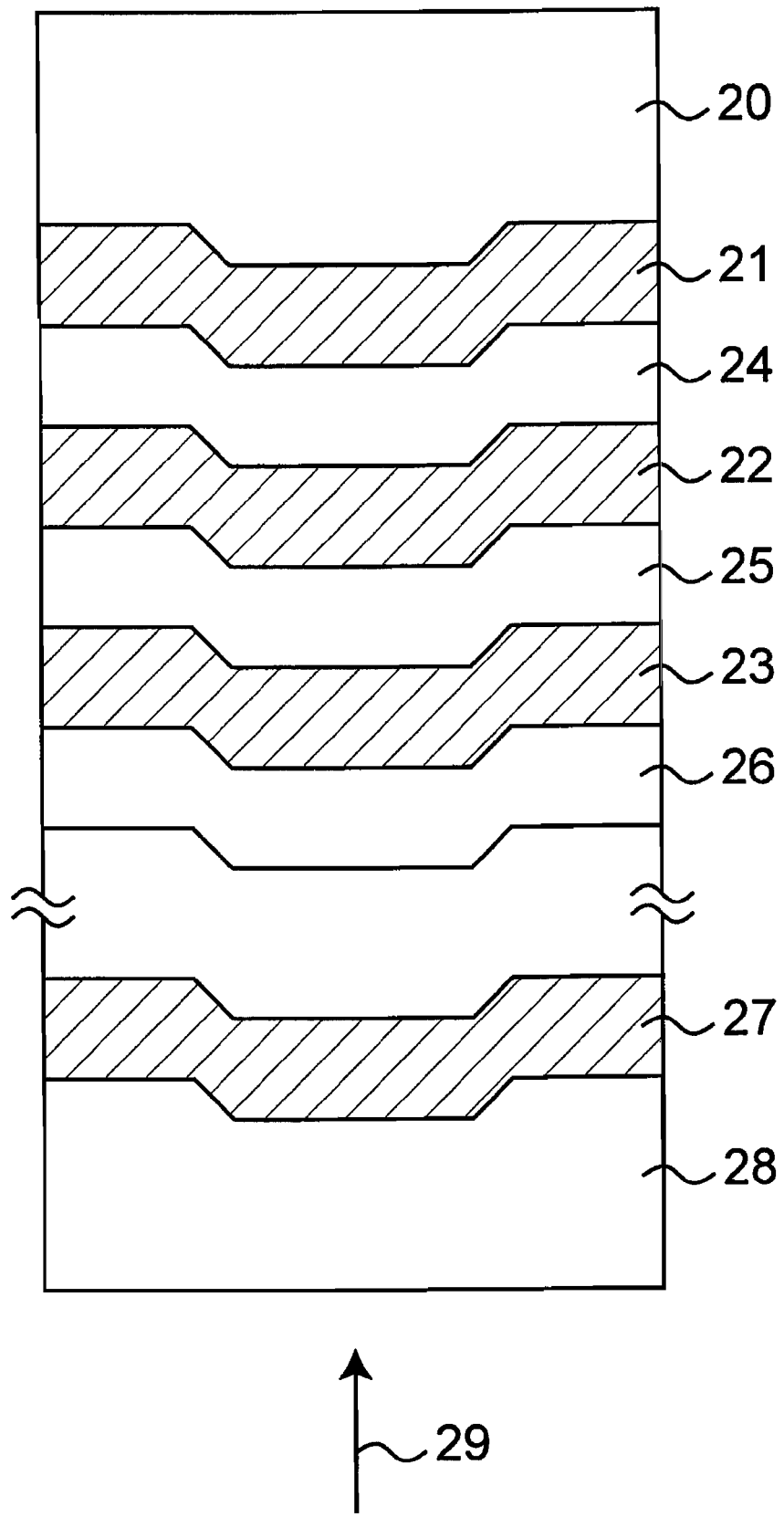
FIG. 2 shows a partial cross-section of a recording medium (an optical disc) according to another embodiment of the present invention, illustrating the structure thereof.

1=an information layer b, 2=an information layer a, 3=a laser beam, 4=a substrate, 5=a reflective layer b, 6=a dielectric layer 2b, 7=a recording layer b, 8=a dielectric layer 1b, 9=an optically separating layer, 10=a reflective layer a, 11=a dielectric layer 2a, 12=a recording layer a, 13=a dielectric layer 1a, 14=a cover layer, 20 =a substrate, 21=a first information layer, 22=a second information layer, 23=a third information layer, 24=an optically separating layer, 25=an optically separating layer, 26=an optically separating layer, 27=a n-th information layer, 28=a cover layer, 29=a laser beam, 30 =a load lock chamber, 31=a main chamber, 32=a film-forming chamber, 33=a film-forming chamber, 34=a film-forming chamber, 35=a film-forming chamber, 36=a film-forming chamber, 37=a film-forming chamber, 38=a film-forming chamber, 40=a substrate, 41=a first information layer (or a information layer b), 42=an optically separating layer, 43=a second information layer (or a information layer a), 44=a cover layer, 45 =a reflective layer, 46 =a dielectric layer (or a dielectric layer 4b), 47=an interface layer (or a dielectric layer 2b), 48 =a recording layer (or a recording layer b), 49=an interface layer (or a dielectric layer 1b), 50=a dielectric layer (or a dielectric layer 3b), 51=a high refractive index layer, 52=a reflective layer, 53=a dielectric layer (or a dielectric layer 4a), 54=an interface layer (or a dielectric layer 2a), 55 =a recording layer (or a recording layer a), 56=an interface layer (or a dielectric layer 1a), 57=a dielectric layer (or a dielectric layer 3a), and 58=a laser beam.

DETAILED DESCRIPTION OF THE INVENTION

Hereinafter, the embodiments of the present invention will be described with reference to the accompanying drawings. The following embodiments are illustrative only, and thus should not be construed as limiting the scope of the present invention in any way.

Embodiment 1

Figure 4:
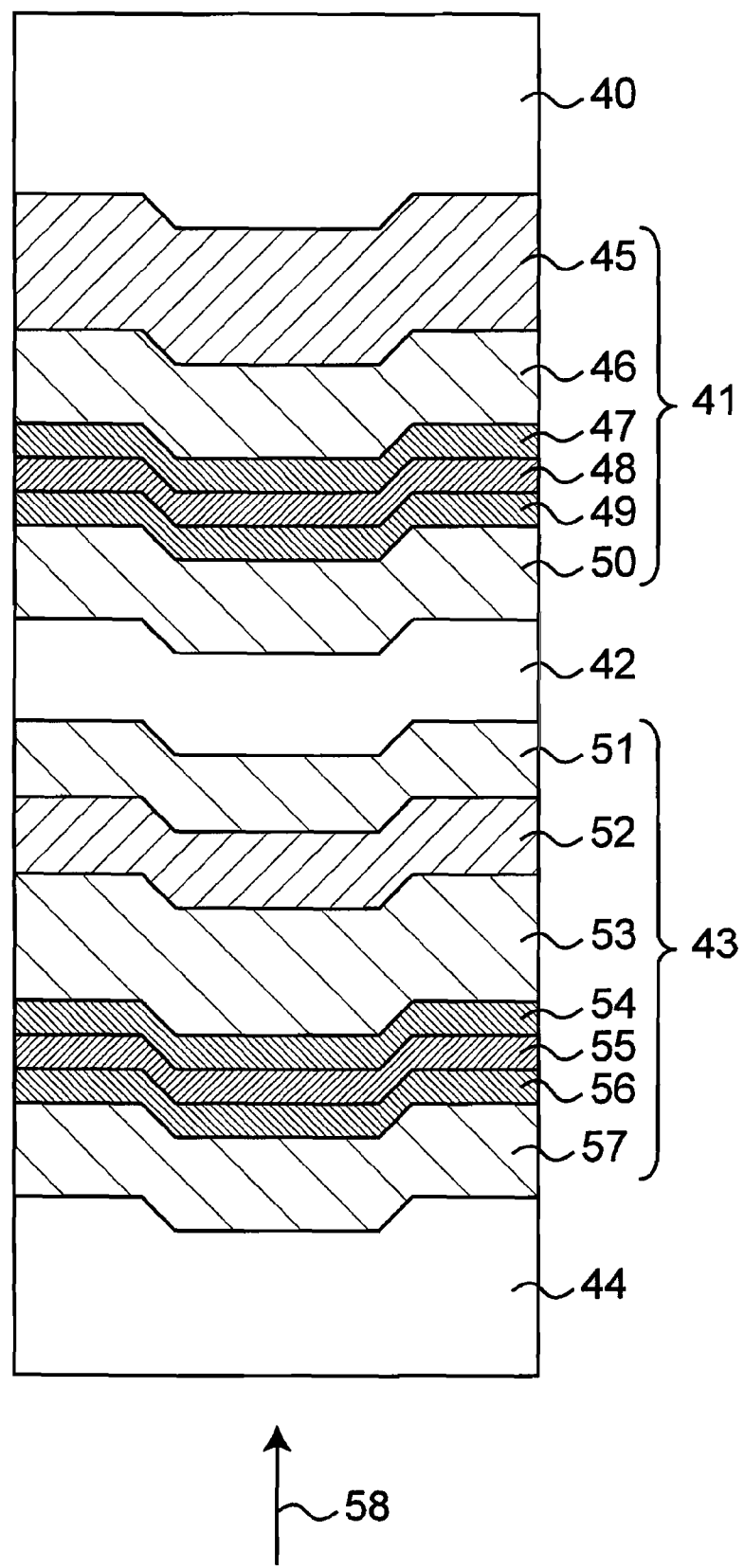
FIG. 4 shows a partial cross-section of a recording medium (an optical disc) according to a further embodiment of the present invention, illustrating the structure thereof.

As Embodiment 1 of the present invention, a disc-shaped information recording medium (an optical disc) for use in recording and reproducing information with a laser beam is described. FIG. 4 shows a partial section of the information recording medium.

The information recording medium shown in FIG. 4 has a construction wherein a first information layer 41 as the information layer b, an optically separating layer 42, a second information layer 43 as the information layer a, and a cover layer 44 are formed in this order on one side of the substrate 40. As seen in FIG. 4, a laser beam for use in the recording and reproducing of information is allowed to income to the recording medium from the side of the cover layer 44.

The substrate 40 is a transparent disc which is flat and smooth at its surface. As a material for the substrate, a resin such as a polycarbonate, an amorphous polyolefin or a polymethyl methacrylate (PMMA), or glass is used. A polycarbonate is preferred in view of moldability, cost and mechanical strength. As the substrate 40 shown in FIG. 4, a substrate with a thickness of about 1.1 mm and a diameter of about 120 mm is preferably used.

One surface of the substrate 40 on which the information layers and so on are formed may have concavo-convex guide grooves formed thereon to lead a laser beam. When the guide grooves are formed on the surface of the substrate 40, the faces of the grooves near to the laser beam are called "groove faces" for convenience, and the faces thereof distant from the laser beam are called "land faces" for convenience. When this medium is used, for example, as a Blu-ray Disc, the difference in height between the groove face and the land face is preferably from 10 nm to 30 nm. In this Blu-ray Disc, recording is made on only the groove faces, and the distance between each of the grooves (from the center of one groove to the center of another groove) is about 0.32 μm.

Firstly, the first information layer 41 as the information layer b is formed on the substrate 40. The first information layer 41 (the information layer b) includes at least a reflective layer 45, a dielectric layer 46, an interface layer 47, a recording layer 48 as the recording layer b, an interface layer 49 and a dielectric layer 50. As seen in FIG., the interface layers 47 and 49 are in contact with the recording layer 48, and thus are equivalent to the above-described dielectric layers 2b and 2a, respectively. The dielectric layer 50 is formed in contact with a surface of the interface layer 49 as the dielectric layer 2b on the side opposite to the recording layer 48, and thus is equivalent to the above-described dielectric layer 3b. The dielectric layer 46 may be called the dielectric layer 4b for convenience.

The optically separating layer 42 is formed on the first information layer 41. The optically separating layer 42 has a function to optically separate the first information layer 41 from the second information layer 43. The optically separating layer 42 is formed of a material transparent to the wavelength of a laser beam which is emitted to record or reproduce a signal on or from the first information layer 41. For example, the optically separating layer 42 is formed of a UV curable resin such as an acrylic resin or an epoxy resin by a spin coating method, or is provided by bonding a transparent film with an adhesive tape or a UV curable resin. If needed, guide grooves or the like are spirally or concentrically formed on the surface of the optically separating layer 42 for the second information layer 43. The thickness of the optically separating layer 42 is preferably from about 5 μm to about 40 μm.

The second information layer 43 as the information layer a is formed on the optically separating layer 42. The second information layer 43 (the information layer a) includes at least a reflective layer 52, a dielectric layer 53, an interface layer 54, a recording layer 55 as the recording layer a, an interface layer 56 and a dielectric layer 57. In the recording medium of this embodiment, a high refractive index layer 51 is further included in the second information layer 43. As shown in Figure, the interface layers 54 and 56 are in contact with the recording layer 55, and thus are equivalent to the above-described dielectric layers 2a and 1a, respectively. The dielectric layer 57 is formed in contact with a surface of the interface layer 56 as the dielectric layer 1a on the side opposite to the recording layer 55, and thus is equivalent to the above-described dielectric layer 3a. The dielectric layer 53 may be called the dielectric layer 4a for convenience.

A cover layer 44 is formed on the second information layer 43. The cover layer 44 may be formed of a UV curable resin such as an acrylic resin or an epoxy resin by the spin coating method, or may be provided by bonding a transparent film to the second information layer 43 with an adhesive tape or a UV curable resin.

Hereinafter, the layers constituting the respective information layers will be described. Preferably, each of the dielectric layer 46 as the dielectric layer 4b and the dielectric layer 53 as the dielectric layer 4a contains at least one compound selected from the oxides of Al, Cr, Dy, Ga, Hf, In, Nb, Sn, Y, Zn, Si, Ta, Mo, W and Zr, the sulfides of ZnS, etc., the nitrides of Al, B, Cr, Ge, Si, Ti, Zr and Ta, and the fluorides of Bi, Ce, Dy, Er, Eu and La. More preferably, each of the dielectric layers 46 and 53 contains at least one compound selected from these compounds in an amount of 33.3 mol % or more.

When each of the dielectric layers 46 and 53 is formed of a mixture of some of these compounds, for example, a mixture of $ZnS$—$SiO_2$ (e.g. $(ZnS)_{80}(SiO_2)_{20}$), $ZrO_2$—$SiO_2$, $ZrO_2$—$Cr_2O_3$, $ZrO_2$—$SiO_2$—$Cr_2O_3$, $ZrO_2$—$Ga_2O_3$, $ZrO_2$—$SiO_2$—$Ga_2O_3$, $ZrO_2$—$SiO_2$—$Cr_2O_3$—$LaF$, $SnO_2$—$Ga_2O_3$, $SnO_2$, $In_2O_3$, $ZrO_2$—$In_2O_3$, $ZrO_2$—$SiO_2$—$In_2O_3$, $HfO_2$—$Cr_2O_3$, $HfO_2$—$SiO_2$ $HfO_2$—$SiO_2$—$Cr_2O_3$, $SnO_2$—$Nb_2O_3$, $SnO_2$—$Si_3N_4$ or the like may be used. When $ZrO_2$ is used, a partially stabilized $ZrO_2((ZrO_2)_{97}(Y_2O_3)_3)$ containing 3 mol % of $Y_2O_3$ or a stabilized $ZrO_2((ZrO_2)_{92}(Y_2O_3)_8)$ containing 8 mol % of $Y_2O_3$ may be used as $ZrO_2$.

When each of these layers is analyzed with an X-ray microanalyzer or an energy dispersive X-ray spectrometer, the composition of the layer is expressed as an elemental composition. When the oxide of a specific element as described above is contained, the oxygen atom and the specific element are detected as constituent elements. When the nitride thereof is contained, the nitrogen atom and the specific element are detected as such. When the fluoride thereof is contained, the fluorine atom and the specific element are detected as such. This detection is also applied to the layers described below.

The thickness of the dielectric layer 46 is preferably from 10 nm to 40 nm, more preferably from 15 nm to 30 nm, from the viewpoints of the reflectance and the recording sensitivity of the disc. The thickness of the dielectric layer 53 is preferably from 5 nm to 30 nm, more preferably from 10 nm to 22 nm, from the viewpoints of the reflectance and the recording sensitivity of the disc. Preferably, the thickness of the dielectric layer 53 is thinner than the thickness of the dielectric layer 46.

The materials for the dielectric layer 50 as the dielectric layer 3b and the dielectric layer 57 as the dielectric layer 3a are the same as those listed as the materials for the dielectric layers 46 and 53, and thus, the detailed description thereof is omitted. The thickness of the dielectric layer 50 is preferably from 40 nm to 80 nm, more preferably from 55 nm to 75 nm, from the viewpoints of the reflectance and the recording sensitivity of the disc. The thickness of the dielectric layer 57 is preferably from 25 nm to 50 nm, more preferably from 30 nm to 45 nm, from the viewpoints of the reflectance and the recording sensitivity of the disc. Preferably, the thickness of the dielectric layer 57 is thinner than the thickness of the dielectric layer 50.

The interface layer 47 as the dielectric layer 2b and the interface layer 49 as the dielectric layer 2a are in contact with the recording layer 48; and the interface layer 54 as the dielectric layer 1b and the interface layer 56 as the dielectric layer 1a are in contact with the recording layer 55. When the recording layers are formed of phase-change materials, the compositions of these dielectric layers in contact with the recording layers, in addition to the compositions of the recording layers themselves, give significant influences on the phase changes between the crystalline states and the amorphous states of the recording layers. The influences of the interface layers on the recording layer are known, for example, from the life characteristics such as the archival characteristics and the archival overwrite characteristics of the recording medium. These characteristics are evaluated after a recorded signal has been stored, that is, subjected to a predetermined environmental test.

In a recording medium poor in the archival characteristics, an initial (or amorphous) recorded mark (i.e. a recorded mark formed before the storage of the recording medium) is susceptible to being crystallized while the recording medium is being subjected to the environmental test. For this reason, this recording medium is hard to provide a good reproduced signal after the storage thereof. In a recording medium poor in the archival overwrite characteristics, an initial recorded mark is hard to be crystallized because of the progression of the amorphousization while the recording medium is being subjected to the environmental test, or the recording layer itself tends to change in its crystallization ability. For this reason, in such a recording medium, a good reproduced signal is hard to be obtained from a signal overwritten on the signal after the storage of the signal.

To obtain a recording medium excellent in these characteristics, it is necessary to design the recording medium by appropriately selecting the compositions of the dielectric layers, taken into consideration the compositions of recording layers and whether one dielectric layer (an interface layer) adjacent to the recording layer is near to or distant from the laser beam-incoming side. By selecting materials for the dielectric layers in contact with the recording layers as will be described later, the recording medium of the present invention has a construction wherein two information layers are common in the compositions of the dielectric layer 2/the recording layer/the dielectric layer 1, and shows good life characteristics. B10

In particular, preferably, each of the interface layers 49 and 56 nearer to the laser incoming side contains at least one compound selected from the oxides of Al, Si, Cr, Ta, Mo, W, Zr and Hf, the nitrides of Al, B, Ge, Si, Ti and Zr, and the fluorides of Dy, Er, Eu, Ce, Bi and La. Each of the interface layers 49 and 56 contains at lest one compound selected from these compounds, in an amount of preferably at least 33.3 mol %, more preferably at least 50.0 mol %. Most preferably, each of the interface layers 49 and 56 substantially consists of one or more compounds selected from these compounds. The term "substantially" herein used means that each of the interface layers 49 and 56 may contain 5 mol % or less of impurities. Alternatively each of the interface layers 49 and 56 may contain one or more compounds selected from the oxides of Dy, Ga, In, Nb, Sn, Y and Zn and the nitrides of Ge and Cr, in addition to the above compound(s).

Preferably, each of the interface layers 47 and 54 more distant from the laser incoming side contains at least one compound selected from the oxides of Zr, Si, Cr, In, Ga and Hf. Each of the interface layers 47 and 54 contains at lest one compound selected from these compounds, in an amount of preferably at least 33.3 mol %, more preferably at least 50.0 mol %. Most preferably, each of the interface layers 47 and 54 substantially consists of one or more compounds selected from these compounds. The term "substantially" herein used means the same as described above. Alternatively, each of the interface layers 47 and 54 may contain one or more compounds selected from the oxides of the other elements, the nitrides and the fluorides which have been described in conjunction with the interface layers 49 and 56, in addition to the above oxide(s).

When each of the interface layers 47, 49, 54 and 56 is formed of a mixture of some of the above compounds, for example, a mixture of $ZrO_2$—$SiO_2$, $ZrO_2$—$Cr_2O_3$, $ZrO_2$—$SiO_2$—$Cr_2O_3$, $ZrO_2$—$Ga_2O_3$, $ZrO_2$—$SiO_2$—$Ga_2O_3$, $ZrO_2$—$SiO_2$—$Cr_2O_3$—$LaF_3$, $SnO_2$—$Ga_2O_3$, $SnO_2$—$In_2O_3$, $ZrO_2$—$In_2O_3$, $ZrO_2$—$SiO_2$—$In_2O_3$, $HfO_2$—$Cr_2O_3$, $HfO_2$—$SiO_2$, $HfO_2$—$SiO_2$—$Cr_2O_3$, $SnO_2$—$Nb_2O_3$, $SnO_2$—$Si_3N_4$ or the like may be used. When $ZrO_2$ is used, a partially stabilized $ZrO_2((ZrO_2)_{97}(Y_2O_3)_3)$ containing 3 mol % of $Y_2O_3$ or a stabilized $ZrO_2((ZrO_2)_{92}(Y_2O_3)_8)$ containing 8 mol % of $Y_2O_3$ may be used as $ZrO_2$.

The thickness of the interface layer 47 is preferably from 3 nm to 30 nm, more preferably from 5 nm to 20 nm, from the viewpoints of the reflectance and the recording sensitivity of the resultant disc. The thickness of the interface layer 54 is preferably from 3 nm to 30 nm, more preferably from 5 nm to 20 nm, from the viewpoints of the reflectance and the recording sensitivity of the resultant disc. Preferably, the thickness of the interface layer 54 is thinner than that of the interface layer 47.

The thickness of the interface layer 49 is preferably from 2 nm to 15 nm, more preferably from 3 nm to 10 nm, from the viewpoints of the reflectance and the recording sensitivity of the resultant disc. The thickness of the interface layer 56 is preferably from 2 nm to 15 nm, more preferably from 3 nm to 10 nm, from the viewpoints of the reflectance and the recording sensitivity of the resultant disc. Preferably, the thickness of the interface layer 56 is thinner than that of the interface layer 49.

The recording medium of the present invention does not necessarily contain the interface layer between the recording layer and the dielectric layer (in other words, the dielectric layer does not necessarily have a two-layered structure). In the recording medium shown in Figure, the interface layers 49 and 56 may be formed as the dielectric layers 1b and 1a, respectively, without the dielectric layers 3b and 3a. In other words, such a recording medium includes the dielectric layers 50 and 57 as the dielectric layers 1b and 1a, without the interface layers 49 and 56. Alternatively, the interface layers 47 and 54 may be formed as the dielectric layers 2b and 2a, without the dielectric layer 4b and 4a. In other words, such a recording medium includes the dielectric layers 46 and 53 as the dielectric layer 2b and 2a, without the interface layers 47 and 54. In any of these cases, the preferable thickness of the interface layers 49, 56, 47 and 54 formed as the dielectric layers 1b, 1a, 2b and 2a is such one as described above in conjunction with the dielectric layers 50, 57, 46 and 53.

Preferably, each of the interface layers as the dielectric layers 1 and 2 which are in contact with the recording layer, respectively, contains a mixture of the oxides represented, for example, by any of the following formulae. Any of these mixtures is suitable to compose any of the interface layers (i.e. the dielectric layers 47, 54, 49 and 56 shown in FIG. 4):

$(MO_2)_A(Cr_2O_3)_{100-A}$(mol %)  (1)

(wherein M represent either or both of Zr and Hf, and A satisfies the relationship of $20 \leq A \leq 80$), and

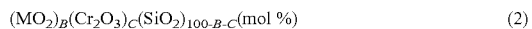

$(MO_2)_B(Cr_2O_3)_C(SiO_2)_{100-B-C}$(mol %)  (2)

(wherein M represent either or both of Zr and Hf; and B and C satisfy the relationships of $20 \leq B \leq 70$, $20 \leq C \leq 60$, and $60 \leq B+C \leq 90$).

Preferably, each of the interface layers as the dielectric layer 1 (i.e. the dielectric layers 49 and 56 shown on FIG. 4) contains a mixture represented by any of the following formulae:

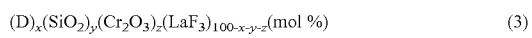

$(D)_x(SiO_2)_y(Cr_2O_3)_z(LaF_3)_{100-x-y-z}$(mol %)  (3)

(wherein D represents at least one oxide selected from $ZrO_2$, $HfO_2$ and $Ta_2O_5$; and x, y and z satisfy the relationships of $20 \leq x \leq 70$, $10 \leq y \leq 50$, $10 \leq z \leq 60$ and $50 \leq x+y+z \leq 90$),

$(Ta_2O_5)_H(SiO_2)_{100-H}$(mol %)  (4)

(wherein H satisfies the relationship of $20 \leq H \leq 80$), and

$(In_2O_3)_I(CeF_3)_{100-I}$(mol %)  (5)

(wherein I satisfies the relationship of $20 \leq I \leq 80$).

Preferably, each of the interface layers as the dielectric layer 2 (i.e. the dielectric layers 47 and 54 shown on FIG. 4) contains a mixture represented by any of the following formulae:

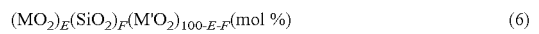

$(MO_2)_E(SiO_2)_F(M'O_2)_{100-E-F}$(mol %)  (6)

(wherein M represents either or both of Zr and Hf; M' represents either of both of Ga and In; and E and F satisfy the relationships of $10 \leq E \leq 80$ and $10 \leq F \leq 70$, provided that the sum of E and F satisfies the relationship of $20 \leq E+F \leq 90$),

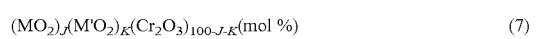

$(MO_2)_J(M'O_2)_K(Cr_2O_3)_{100-J-K}$(mol %)  (7)

(wherein M represents either or both of Zr and Hf; M' represents either or both of Ga and In; and J and K satisfy the relationships of $10 \leq J \leq 80$ and $10 \leq K \leq 70$, respectively, provided that the sum of J and K satisfies the relationship of $20 \leq J+K \leq 90$), and

$(MO_2)_G(M'_2O_3)_{100-G}$(mol %)  (8)

(wherein M represents either or both of Zr and Hf; M' represents either or both of Ga and In; and G satisfies the relationship of $20 \leq G \leq 80$).

Any of the mixtures represented by the above formulae is excellent in adhesion to the recording layer, and is hard to permit the substances to transfer when in contact with the recording layer. In addition, the use of any of these mixtures is effective to provide a recording medium having excellent archival characteristics and excellent archival overwrite characteristics even when the compositions of the recording layers in two information layers are the same.

A layer containing a mixture of at least two compounds selected from the above-listed oxides, nitrides and fluorides has a composition substantially the same as the composition of a sputtering target, when the layer is formed by a method described later, particularly the sputtering process. Accordingly, the compositions of these dielectric layers are generally represented by the compositions of the sputtering targets. The sputtering target is usually provided with the indication of the proportions of compounds.

The recording layers 48 and 55 are changed in their phases between crystal phases and amorphous phases when exposed to light, to thereby form recording marks thereon. When the phase change is irreversible, erasure and overwriting are possible. As the irreversible phase-change material, a material containing one or more elements selected from Ge, Te, Se, In and Sb is preferably used. Specifically, the use of TeGeSb, TeGeSn, TeGeSnAu, SbSe, SbTe, SbSeTe, InTe, InSe, InSeT1, InSb, InSbSe, GeSbTeAg, GeTe, GeTeIn, GeTeBi, GeTeBiIn or the like as such a material is preferred. Particularly, a material containing Ge and Te is preferably used. More preferably, the material containing Ge and Te contains at least one element selected from In, Bi, Sn, Ag, Sb, Ga and Al.

More specifically, the recording layer preferably includes a Ge—Bi—Te-M"-based material of the following formula:

$Ge_aBi_bTe_dM''_{100-a-b-d}$(at. %)  (11)

(wherein M" represents at least one element selected from Al, Ga and In; and a, b and d satisfy the relationships of $25 \leq a \leq 60$, $0 < b \leq 18$, $35 \leq d \leq 55$ and $82 \leq a+b+d < 100$). The recording layer containing this material is particularly suitable to make the compositions of the dielectric layer 1, the recording layer and the dielectric layer 2 to be common in the information layers a and b, together with the dielectric layers 1 and 2 containing the above-specified compound (or element).

The material represented by the above formula also can be represented by the following formula as a mixture (or an alloy) of telluride of Ge, M" and Bi:

$$(GeTe)_u[(M''_2Te_3)_v(Bi_2Te_3)_{1-v}]_{100-u} (\text{mol \%}) \tag{12}$$

(wherein M" represents at least one element selected from Al, Ga and In; and u and v satisfy the relationships of $80 \leq u < 100$ and $0 < v < 0.9$).

The recording layer containing the material represented by the formula (11) or (12) further contains a material which contains Sn and which is represented by the formula (13) or (14):

$$Ge_aSn_bBi_bTe_dM_{100-a-b-d-f} (\text{at. \%}) \tag{13}$$

(wherein M represents at least one element selected from Al, Ga and In; and a, b, d and f satisfy the relationships of $25 \leq a \leq 60$, $0 < b \leq 18$, $35 \leq d \leq 55$, $0 < f \leq 15$, $82 \leq a+b+d < 100$, and $82 < a+b+d+f < 100$), and $$[(SnTe)_t(GeTe)_{1-t}]_u[(M_2Te_3)_v(Bi_2Te_3)_{1-v}]_{100-u} (\text{mol \%}) \tag{14}$$

(wherein M represents at least one element selected from Al, Ga and In; and u, v and t satisfy the relationships of $80 \leq u < 100$, $0 < v \leq 0.9$ and $0 < t \leq 0.3$).

The thickness of the recording layer 48 is preferably from 8 nm to 18 nm from the viewpoint of the reflectance. The thickness of the recording layer 55 is preferably from 5 nm to 12 nm, in consideration of the transmittance of the information layer a. Also, preferably, the recording layers 48 and 55 satisfy the relationship of the thickness of the recording layer 48>the thickness of the recording layer 55, because the transmittance of the information layer a is needed to be higher.

Each of the reflective layers 45 and 52 preferably contains 90 at % or more of at least one metal element selected from Ag, Au and Al as a main component. These metal elements are preferably used, since they are excellent in corrosion resistance, and since the use of any of these metal elements is effective to form a reflective layer having a quenching function. Each of the reflective layers 45 and 52 may contain at least one element selected from Mg, Ca, Cr, Nd, Pd, Cu, Ni, Co, Pt, Ga, Dy, In, Nb, V, Ti and La, in addition to at least one metal element selected from Ag, Au and Al. At least two metal elements generally form a reflective layer as an alloy.

The thickness of the reflective layer 45 is preferably from 50 nm to 160 nm, more preferably from 60 nm to 100 nm, from the viewpoint of the reflectance. The thickness of the reflective layer 52 is preferably from 6 nm to 15 nm, more preferably from 8 nm to 12 nm, in consideration of the transmittance of the information layer a. When the thickness of the reflective layers is too small, heat is hard to diffuse in the recording layer, and thus the recording layer is hard to be amorphousized. When the thickness of the reflective layer is too large, heat tends to diffuse excessively in the recording layer, and thus the recording sensitivity may be lowered.

The high refractive index layer 51 is provided to control the transmittance of the second information layer 43 (the information layer a). The high refractive index layer 51 preferably contains at least one compound selected from the oxides of Ti and Nb and the nitrides of Ti and Nb, more preferably contains at least 50 mol % of such compound(s) as a main component. These compounds show high refractive indexes with respect to, for example, a laser beam with a wavelength of about 400 nm. For example, $TiO_2$ shows a refractive index of 2.7 with respect to a wavelength of 400 nm. In contrast, ZnS-20 mol % $SiO_2$ usable as a material for the dielectric layers 46, 50, 53 and 57 shows a refractive index of 2.3; and $ZrO_2$-50 mol % $In_2O_3$ usable as a material for the interface layers 47, 49, 54 and 56 shows a refractive index of 2.2.

When the refractive indexes of the dielectric layer 54, the reflective layer 52 and the high refractive index layer 51 in the second information layer 43 with respect to the wavelength of light for use in the recording and reproducing of information are $n1a$, $n2a$ and $n3a$, respectively, it is preferable to satisfy the relationships of $n1a < n3a$ and $n2a < n3a$. By doing so, the information layer a can achieve a higher transmittance. The thickness of the high refractive index layer 51 is preferably from 15 nm to 30 nm, more preferably from nm 18 to 25 nm, in consideration of the transmittance of the information layer a.

The dielectric layer, the recording layer, the reflective layer, the interface layer and the high refractive index layer are generally formed by the electron beam deposition process, the sputtering process, the CVD process or the laser sputtering process. Preferably, these layers are formed by the sputtering process. DC sputtering using a direct current power supply or RF sputtering using a radio frequency power supply is selected depending on a material which is to be subjected to sputtering. In general, the dielectric layers (including the interface layers) are formed by RF sputtering, and the recording layers and the reflective layers are formed by DC sputtering. Preferably, the high refractive index layer is formed by DC sputtering. An inert gas such as Ar is used as a sputter gas necessary for the sputtering, and oxygen, nitrogen or the like may be used as an additional gas together with the inert gas.

When these layers are formed by the sputtering process, a cluster type (or sheet-fed) sputtering apparatus is preferably used, as mentioned above. According to the recording medium of the present invention, the recording layer and the two dielectric layers in contact with the recording layer in one of the two information layers have compositions common to those of such layers in the other information layer, respectively. Accordingly, at least these three layers are formed twice in three film-forming chambers for use in the formation of these three layers, without the need to replace the targets, in the cluster type sputtering apparatus.

Figure 3:
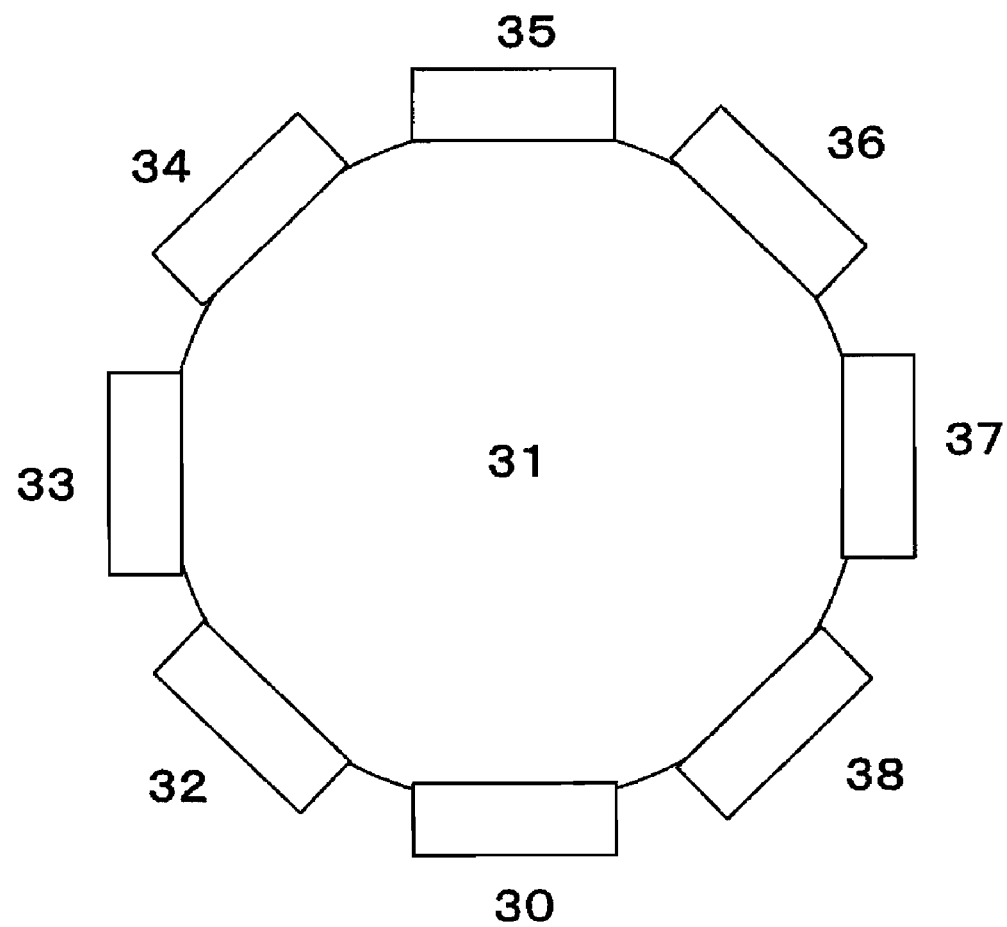
FIG. 3 shows a schematic plan view of an example of an apparatus for producing the recording medium of the present invention.

The schematic description of the cluster type sputtering apparatus has been previously made with reference to FIG. 3. As described above, the conventional information recording medium has suffered from the foregoing problems since the compositions of the recording layer and/or the dielectric layers in contact with the recording layer are different in every information layer, targets are needed to be replaced so as to form the two information layers in the conventional information recording medium by allowing a substrate to round through the respective film-forming chambers of the sputtering apparatus twice. As described above, a moisture enters the film-forming chamber when the target is replaced, and the moisture is left to remain after the evacuation in vacuum and is likely to give an adverse influence on the quality of a layer formed by sputtering. Therefore, it is needed to evacuate the film-forming chamber in vacuum for a long time after the replacement of the target and to carry out pre-sputtering for a long time, so as to produce a recording medium having stable characteristics.

In general, the time spent for vacuum evacuation and the time spent for pre-sputtering are needed to be more and more increased, as the recording density and the speed of a disc becomes higher and higher. The higher the recording density and the speed of the disc becomes, the higher the required standard of the film quality becomes. Under such a situation, a very little amount of residual moisture gives a serious influence on the characteristics of the film quality, and further gives adverse influences on the recording/reproducing characteristics and/or the life characteristics of the recording medium. For example, when a 2-fold speed disc adapted to the standard of Blu-ray is produced, it takes 30 minutes in the replacement of the target, and it takes 30 minutes or longer in the vacuum evacuation of the film-forming chamber after the replacement of the target, and further, sometimes, it takes 1.5 hours or longer in pre-sputtering, while such time varies depending on a selected apparatus. The above time leads to a production loss. According to the present invention, it is possible to eliminate or reduce such a production loss, because the replacement of the target is not needed.

In the recording medium shown in FIG. 4, at least, the interface layers 47 and 54 have the same composition, the recording layers 48 and 55 have the same composition, and the interface layers 49 and 56 have the same composition, respectively. Accordingly, the targets are not needed to be replaced in three film-forming chambers for use in the formation of these three kinds of layers. Consequently, the recording medium of the present invention can be efficiently produced, since the time spent for the replacement of the target and vacuum evacuation and pre-sputtering in association with the replacement of the target can be eliminated or reduced. Further, when the compositions of the reflective layer 45 and 52 are the same, these layers can be formed without the need of replacement of the target. Therefore, the recording medium can be more efficiently manufactured. This is applicable to the case where the compositions of the dielectric layers 46 and 53 are the same, and the case where the compositions of the dielectric layers 50 and 57 are the same. In other words, the larger the number of pairs of layers whose compositions are the same in two information layers becomes, the higher the manufacturing efficiency becomes.

The recording medium shown in FIG. 4 may be realized as a disc adapted to the DVD standards, on or from which information is recorded or reproduced, using a laser beam with a wavelength of 650 nm to 670 nm. Otherwise, this recording medium may be realized as a disc adapted to the Blu-ray standards, on or from which information is recorded or reproduced, using a laser beam with a wavelength of 395 nm to 415 nm. Particularly, this recording medium is preferably realized as a disc adapted to the Blu-ray standards and to a 2-fold or higher speed play. Because such a high density and high-speed optical disc is susceptible to influences of residual moisture, such influences can be eliminated or lessened by forming two information layers without the replacement of the targets.

The embodiment shown in FIG. 4 may be appropriately modified. For example, the interface layers 47 and 54 may be eliminated so that the dielectric layers 46 and 53 alone are provided as the dielectric layers 1b and 1a. Otherwise, a substrate is used instead of the cover layer, so that the second information layer and the first information layer are formed in this order by sequentially forming the layers from the lowermost layer shown in Figure.

Embodiment 2

Another embodiment of the information recording medium of the present invention is illustrated with reference to FIG. 1 showing a part of the section thereof. Also, the recording medium shown in FIG. 1, similarly to the recording medium shown in FIG. 4, has a construction wherein a first information layer as the information layer b, an optically separating layer 9, a second information layer 2 as the information layer a and a cover layer 13 are formed in this order on one surface of the substrate 4. As seen in FIG. 1, a laser beam 3 for use in recording or reproducing information is allowed to income from the side of the cover layer 14. The first information layer 1 includes a reflective layer 5, a dielectric layer 6, a recording layer 7 and a dielectric layer 8. The second information layer 2 includes a reflective layer 10, a dielectric layer 11, a recording layer 12 and a dielectric layer 13.

The recording medium shown in FIG. 1 differs from the recording medium shown in FIG. 4, in the following points: that is, the dielectric layers 4b and 3b and the dielectric layers 4a and 3a are not provided, and no high refractive index layer is provided. In this embodiment, the first information layer 1 includes the dielectric layer 6 as the dielectric layer 2b, and the dielectric layer 8 as the dielectric layer 1b; and the second information layer 2 includes the dielectric layer 11 as the dielectric layer 2a, and the dielectric layer 13 as the dielectric layer 1a. Also, in this embodiment, the compositions of the dielectric layers 6 and 11 are the same; the compositions of the dielectric layers 8 and 13 are the same; and the compositions of the recording layers 7 and 12 are the same.

In this embodiment, preferable compounds to be contained in the dielectric layers 6 and 11 are the same as the preferable compounds contained in the interface layers 47 and 54 described with reference to FIG. 4. In case where no other dielectric layer is laid between the dielectric layer 6 and the reflective layer 5 and between the dielectric layer 11 and the reflective layer 10, as shown in FIG. 1, the dielectric layers 6 and 11 preferably contain the materials of the formula (1), (2), (6), (7) or (8). The thickness of the dielectric layer 6 and that of the dielectric layer 11 are preferably from 40 to 80 nm, respectively.

Preferable compounds to be contained in the dielectric layers 8 and 13 are the same as the preferable compounds contained in the interface layers 49 and 56 described with reference to FIG. 4. In case where no other dielectric layer is laid between the dielectric layer 8 and the recording layer 7 and between the dielectric layer 13 and the recording layer 12, as shown in FIG. 1, the dielectric layers 8 and 13 preferably contain the materials of the formula (1), (2), (3), (4) or (5). The thickness of the dielectric layer 8 and that of the dielectric layer 13 are preferably from 25 nm to 50 nm, respectively.

Other components of the recording medium are the same as described in conjunction with FIG. 4, and thus, the detailed descriptions thereof are omitted. However, it is needed to select suitable materials and suitable thickness for the layers, paying attention to the point that the optical characteristics of the respective information layers differ from those of the information layers shown in FIG. 4, since each of the dielectric layers has a single-layer structure and since no high refractive index layer is provided.

Example 1

(Sample 1 (for Comparison))
A recording medium having the structure shown in FIG. 4 was produced. A polycarbonate substrate with a diameter of 120 mm and a thickness of 1.1 mm, of which one surface had guide grooves with depth of 20 nm formed at pitches of about 0.32 μm (pitch is a distance between two adjacent grooves), was used as the substrate 40. The first information layer 41 was formed on the substrate. Specifically, a layer of an alloy containing 90 at % or more of Ag was formed with a thickness of 100 nm as the reflective layer 45; a layer of ZnS-20 mol %

SiO$_2$ was formed with a thickness of 25 nm as the dielectric layer 46; a layer of C was formed with a thickness of 2 nm as the interface layer 47; a layer of Ge$_{43.5}$Sb$_7$Te$_{49.5}$ was formed with a thickness of 12 nm as the recording layer 48; a layer of ZrO$_2$-50 mol % Cr$_2$O$_3$ was formed with a thickness of 5 nm as the interface layer 49; and a layer of ZnS-20 mol % SiO$_2$ was formed with a thickness of 65 nm as the dielectric layer 50. These layers were formed in this order by the magnetron sputtering process.

Subsequently, a UV curable resin (an acrylic resin) was applied to the surface of the first information layer 41. A polycarbonate substrate with a diameter of 120 mm and a thickness of 0.6 mm, of which one surface has guide grooves with depth of 20 nm formed at pitches of about 0.32 μm (pitch is a distance between two adjacent grooves), was laminated on the UV curable resin. The laminate was exposed to UV to cure the UV curable resin, and then, the polycarbonate substrate was peeled to obtain an optically separating layer with a thickness of 25 μm which had the transferred grooves on its surface.

Subsequently, the second information layer 43 was formed on the optically separating layer. Specifically, a layer of TiO$_2$ was formed with a thickness of 24 nm as the high refractive index layer 51; a layer of an Ag alloy having the same composition as that of the reflective layer 45 in the first information layer was formed with a thickness of 10 nm as the reflective layer 52; a layer of ZrO$_2$-35 mol % SiO$_2$-30 mol % Cr$_2$O$_3$ was formed with a thickness of 13 nm as the dielectric layer 53; a layer of ZrO$_2$-50 mol % Cr$_2$O$_3$ was formed with a thickness of 5 nm as the interface layer 54; a layer of Ge$_{44}$Sb$_6$Te$_{so}$ was formed with a thickness of 7 nm as the recording layer 55; a layer of ZrO$_2$-50 mol % Cr$_2$O$_3$ was formed with a thickness of 5 nm as the interface layer 56; and a layer of ZnS-20 mol % SiO$_2$ was formed with a thickness of 35 nm as the dielectric layer 57. These layers were formed in this order by the magnetron sputtering process. Subsequently, a cover layer 44 with a thickness of 0.1 mm was formed of an acrylic resin by the spin coating method.

Each of the first information layer 41 and the second information layer was formed using a cluster type sputtering apparatus having seven film-forming chambers shown in FIG. 3. A single sputtering apparatus was used for forming the two information layers. The dielectric layers 50 and 57 were formed in the film-forming chamber 32; the interface layers 49 and 56 were formed in the film-forming chamber 33; the recording layers 48 and 55 were formed in the film-forming chamber 34; the interface layers 47 and 54 were formed in the film-forming chamber 35; the dielectric layers 46 and 53 were formed in the film-forming chamber 36; the reflective layers 45 and 52 were formed in the film-forming chamber 37; and the high refractive index layers 51 was formed in the film-forming chamber 38. All the layers were formed by the sputtering process.

In this sample, the compositions of the layers were different from each other in each of the combination of the dielectric layers 46 and 53, the combination of the interface layers 47 and 54 and the combination of the recording layers 48 and 55, each of the combinations being formed in the common film-forming chambers. For this reason, after the formation of the first information layer 41, the targets of the film-forming chambers for forming these layers were replaced, and then, the second information layer 43 was formed. The time spent for the replacement of the targets was 30 minutes. After that, the chambers were evacuated in vacuum for 30 minutes, and pre-sputtering was performed for 30 minutes. After that, the disc was sampled at every 30 minutes intervals. The layers constituting each of the information layers, the film-forming chambers for use in the formation of the layers, and the power supply, and the need of the replacement of the targets prior to the formation of the second information layer are shown in Table 1.

TABLE 1

| Film Forming Chamber | Power Supply | Composition of First Information Layer 41 | | Replacement of Target | Composition of Second Information Layer 43 | |
|---|---|---|---|---|---|---|
| Film Forming Chamber 38 | DC | | | Not necessary | High Refractive Index Layer 51 | TiO$_2$ |
| Film Forming Chamber 37 | DC | Reflective Layer 45 | Ag Alloy | Not necessary | Reflective Layer 52 | Ag Alloy |
| Film Forming Chamber 36 | RF | Dielectric Layer 46 | ZnS-20 mol % SiO$_2$ (=(ZnS)$_{80}$(SiO$_2$)$_{20}$) | Necessary | Dielectric Layer 53 | ZrO$_2$-35 mol % SiO$_2$-30 mol % Cr$_2$O$_3$ = (ZnO$_2$)$_{35}$(SiO$_2$)$_{35}$(Cr$_2$O$_3$)$_{30}$) |
| Film Forming Chamber 35 | RF | Interface Layer 47 | C | Necessary | Interface Layer 54 | ZrO$_2$-50 mol % Cr$_2$O$_3$ (=(ZrO$_2$)$_{50}$(Cr$_2$O$_3$)$_{50}$) |
| Film Forming Chamber 34 | DC | Recording Layer 48 | Ge$_{43.5}$Sb$_7$Te$_{49.5}$ | Necessary | Recording Layer 55 | Ge$_{44}$Sb$_6$Te$_{50}$ |
| Film Forming Chamber 33 | RF | Interface Layer 49 | ZrO$_2$-50 mol % Cr$_2$O$_3$ (=(ZrO$_2$)$_{50}$(Cr$_2$O$_3$)$_{50}$) | Necessary | Interface Layer 56 | ZrO$_2$-50 mol % Cr$_2$O$_3$ (=(ZrO$_2$)$_{50}$(Cr$_2$O$_3$)$_{50}$) |
| Film Forming Chamber 32 | RF | Dielectric Layer 50 | ZnS-20 mol % SiO$_2$ (=(ZnS)$_{80}$(SiO$_2$)$_{20}$) | Not necessary | Dielectric Layer 57 | ZnS-20 mol % SiO$_2$ (=(ZnS)$_{80}$(SiO$_2$)$_{20}$) |

(Sample 2 (for Comparison))

A recording medium having a structure similar to the structure shown in FIG. 4 was produced. As a substrate 40, the same polycarbonate substrate as that used for the production of Sample 1 was used. A first information layer 41 was formed on the polycarbonate substrate. Specifically, a layer of an alloy containing 90 at % or more of Ag was formed with a thickness of 100 nm as a reflective layer 45; a layer of $ZrO_2$-50 mol % $Cr_2O_3$ was formed with a thickness of 25 nm as a dielectric layer 46; a layer of $Ge_{45}Sb_4Te_{51}$ was formed with a thickness of 12 nm as a recording layer 48; a layer of $ZrO_2$-50 mol % $Cr_2O_3$ was formed with a thickness of 5 nm as an interface layer 49; and a layer of ZnS-20 mol % $SiO_2$ was formed with a thickness of 65 nm as a dielectric layer 50. These layers were formed in this order by the magnetron sputtering process. Sequentially, an optically separating layer 42 with a thickness of 25 μm was formed on the first information layer 41 according to the same procedures as those employed in Sample 1.

Sequentially, a second information layer 43 was formed on the optically separating layer. Specifically, a layer of $TiO_2$ was formed with a thickness of 24 nm as a high refractive index layer 51; a layer of an Ag alloy having the same composition as that of the reflective layer 45 in the first information layer was formed with a thickness of 10 nm as a reflective layer 52; a layer of $ZrO_2$-50 mol % $Cr_2O_3$ was formed with a thickness of 18 nm as a dielectric layer 53; a layer of $Ge_{46}Sb_3Te_{51}$ was formed with a thickness of 7 nm as a recording layer 55; a layer of $ZrO_2$-50 mol % $Cr_2O_3$ was formed with a thickness of 5 nm as an interface layer 56; and a layer of ZnS-20 mol % $SiO_2$ was formed with a thickness of 35 nm as a dielectric layer 57. These layers were formed in this order by the magnetron sputtering process. Sequentially, a cover layer 44 with a thickness of 0.1 mm was formed of an acrylic resin by the spin coating method. This sample had not interface layers 47 and 54, differently from Sample 1, and the dielectric layer 46 and 53 were formed as the dielectric layers 2b and 2a in the two information layers a and b.

Each of the first information layer and the second information layer were formed using the cluster type sputtering apparatus having seven film-forming chambers 32 to 38 shown in FIG. 3, as well as Sample 1. Since this sample had not the interface layers 47 and 54, the film-forming chamber 53 was not used.

In the production of this sample, the compositions of the recording layers 48 and 55 formed in the same film-forming chamber were different from each other, and thus, the target of the film-forming chamber for forming the recording layer was replaced after the formation of the first information layer 41, and then, the second information layer 43 was formed. The time spent for the replacement of the target was 30 minutes. After that, the film-forming chamber was evacuated in vacuum for 30 minutes, and pre-sputtering was performed for 30 minutes.

After that, the disc was sampled at every 30 minutes intervals. The layers constituting each of the information layers, the film-forming chambers and the power supply used to form the respective layers, and the need of the replacement of the target before the formation of the second information layer are shown in Table 2.

TABLE 2

| Film Forming Chamber | Power Supply | Composition of First Information Layer 41 | | Replacement of Target | Composition of Second Information Layer 43 | |
|---|---|---|---|---|---|---|
| Film Forming Chamber 38 | DC | | | Not necessary | High Refractive Index Layer 51 | $TiO_2$ |
| Film Forming Chamber 37 | DC | Reflective Layer 45 | Ag Alloy | Not necessary | Reflective Layer 52 | Ag Alloy |
| Film Forming Chamber 36 | RF | Dielectric Layer 46 | $ZrO_2$-50 mol % $Cr_2O_3$ $(=(ZrO_2)_{50}(Cr_2O_3)_{50})$ | Not necessary | Dielectric Layer 53 | $ZrO_2$-50 mol % $Cr_2O_3$ $(=(ZrO_2)_{50}(Cr_2O_3)_{50})$ |
| Film Forming Chamber 35 | RF | Interface Layer 47 | (Not Provided) | Not necessary | Interface Layer 54 | (Not Provided) |
| Film Forming Chamber 34 | DC | Recording Layer 48 | $Ge_{45}Sb_4Te_{51}$ | Necessary | Recording Layer 55 | $Ge_{46}Sb_3Te_{51}$ |
| Film Forming Chamber 33 | RF | Interface Layer 49 | $ZrO_2$-50 mol % $Cr_2O_3$ $(=(ZrO_2)_{50}(Cr_2O_3)_{50})$ | Not necessary | Interface Layer 56 | $ZrO_2$-50 mol % $Cr_2O_3$ $(=(ZrO_2)_{50}(Cr_2O_3)_{50})$ |
| Film Forming Chamber 32 | RF | Dielectric Layer 50 | ZnS-20 mol % $SiO_2$ $(=(ZnS)_{80}(SiO_2)_{20})$ | Not necessary | Dielectric Layer 57 | ZnS-20 mol % $SiO_2$ $(=(ZnS)_{80}(SiO_2)_{20})$ |

(Sample 3 (for Comparison))

A recording medium having the structure shown in FIG. 4 was manufactured. As a substrate 40, the same polycarbonate substrate as that used for the manufacturing of Sample 1 was used. A first information layer 41 was formed on the polycarbonate substrate. Specifically, a layer of an alloy containing 90 at % or more of Ag was formed with a thickness of 80 nm as a reflective layer 45; a layer of $SnO_2$-15 mol % SiC was formed with a thickness of 13 nm as a dielectric layer 46; a layer of $ZrO_2$-15 mol % $SiO_2$-70 mol % $Ga_2O_3$ was formed with a thickness of 5 nm as an interface layer 47; a layer of $Ge_{40}Bi_4Te_{51}Sn_5$ was formed with a thickness of 12 nm as a recording layer 48; a layer of $ZrO_2$-50 mol % $Cr_2O_3$ was formed with a thickness of 5 nm as an interface layer 49; and a layer of ZnS-20 mol % $SiO_2$ was formed with a thickness of 60 nm as a dielectric layer 50. These layers were formed in this order by the magnetron sputtering process. Sequentially, an optically separating layer 42 with a thickness of 25 μm was formed on the first information layer 41 according to the same procedure as those employed in Sample 1.

Sequentially, a second information layer 43 was formed on the optically separating layer 43. Specifically, a layer of $TiO_2$ was formed with a thickness of 23 nm as a high refractive index layer 51; a layer of an Ag alloy having the same composition as that of the reflective layer 45 in the first information layer was formed with a thickness of 10 nm as a reflective layer 52; a layer of $ZrO_2$-25 mol % $SiO_2$-50 mol % $Cr_2O_3$ was formed with a thickness of 6 nm as a dielectric layer 53; a layer of $ZrO_2$-25 mol % $SiO_2$-50 mol % $Ga_2O_3$ was formed with a thickness of 6 nm as an interface layer 54; a layer of $Ge_{45}Bi_4Te_{51}$ was formed with a thickness of 7 nm as a recording layer 55; a layer of $ZrO_2$-50 mol % $Cr_2O_3$ was formed with a thickness of 5 nm as an interface layer 56; and a layer of ZnS-20 mol % $SiO_2$ was formed with a thickness of 35 nm as a dielectric layer 57. These layers were formed in this order by the magnetron sputtering process. Sequentially, a cover layer 44 with a thickness of 0.1 mm was formed of an acrylic resin by the spin coating method.

Each of the first information layer and the second information layer were formed using the cluster type sputtering apparatus having seven film-forming chambers shown in FIG. 3, as well as Sample 1. In this sample, the compositions of the layers were different from each other in each of the combination of the dielectric layers 46 and 53, the combination of the interface layers 47 and 54 and the combination of the recording layers 48 and 55, each of which combinations being formed in the common film-forming chambers. Therefore, the targets of the film-forming chambers for forming these layers were replaced after the formation of the first information layer 41, and then, the second information layer 43 was formed. The time spent for the replacement of the targets was 30 minutes. After that, the film-forming chambers were evacuated in vacuum for 30 minutes, and pre-sputtering was performed for 30 minutes. After that, the disc was sampled at every 30 minutes intervals. The layers constituting each of the information layers, the film-forming chambers and the power supply used to form the respective layers, and the need of the replacement of the targets before the formation of the second information layer are shown in Table 3.

TABLE 3

| Film Forming Chamber | Power Supply | Composition of First Information Layer 41 | | Replacement of Target | Composition of Second Information Layer 43 | |
|---|---|---|---|---|---|---|
| Film Forming Chamber 38 | DC | | | Not necessary | High Refractive Index Layer 51 | $TiO_2$ |
| Film Forming Chamber 37 | DC | Reflective Layer 45 | Ag Alloy | Not necessary | Reflective Layer 52 | Ag Alloy |
| Film Forming Chamber 36 | RF | Dielectric Layer 46 | $SnO_2$-15 mol % SiC $(=(SnO_2)_{85}(SiC)_{15})$ | Necessary | Dielectric Layer 53 | $ZrO_2$-25 mol % $SiO_2$-50 mol % $Cr_2O_3$ $(=(ZrO_2)_{25}(SiO_2)_{25}(Cr_2O_3)_{50})$ |
| Film Forming Chamber 35 | RF | Interface Layer 47 | $ZrO_2$-15 mol % $SiO_2$-70 mol % $Ga_2O_3$ $(=(ZrO_2)_{15}(SiO_2)_{15}(Ga_2O_3)_{70})$ | Necessary | Interface Layer 54 | $ZrO_2$-25 mol % $SiO_2$-50 mol % $Ga_2O_3$ $(=(ZrO_2)_{25}(SiO_2)_{25}(Ga_2O_3)_{50})$ |
| Film Forming Chamber 34 | DC | Recording Layer 48 | $Ge_{40}Bi_4Te_{51}Sn_5$ | Necessary | Recording Layer 55 | $Ge_{45}Bi_4Te_{51}$ |
| Film Forming Chamber 33 | RF | Interface Layer 49 | $ZrO_2$-50 mol % $Cr_2O_3$ $(=(ZrO_2)_{50}(Cr_2O_3)_{50})$ | Not necessary | Interface Layer 56 | $ZrO_2$-50 mol % $Cr_2O_3$ $(=(ZrO_2)_{50}(Cr_2O_3)_{50})$ |
| Film Forming Chamber 32 | RF | Dielectric Layer 50 | ZnS-20 mol % $SiO_2$ $(=(ZnS)_{80}(SiO_2)_{20})$ | Not necessary | Dielectric Layer 57 | ZnS-20 mol % $SiO_2$ $(=(ZnS)_{80}(SiO_2)_{20})$ |

(Sample 4)

A recording medium having a structure similar to the structure shown in FIG. 4 was produced. As a substrate 40, the same polycarbonate substrate as that used for the production of Sample 1 was used. A first information layer 41 was formed on the polycarbonate substrate. Specifically, a layer of an alloy containing 90 at % or more of Ag was formed with a thickness of 80 nm as a reflective layer 45; a layer of $ZrO_2$-50 mol % $In_2O_3$ was formed with a thickness of 23 nm as a dielectric layer 46; a layer of $Ge_{43}Bi_4Te_{51}In_2$ was formed with a thickness of 12 nm as a recording layer 48; a layer of $ZrO_2$-50 mol % $Cr_2O_3$ was formed with a thickness of 5 nm as an interface layer 49; and a layer of ZnS-20 mol % $SiO_2$ was formed with a thickness of 60 nm as a dielectric layer 50. These layers were formed in this order by the magnetron sputtering process. Sequentially, an optically separating layer 42 with a thickness of 25 μm was formed on the first information layer 41 according to the same procedure as those employed in Sample 1.

Sequentially, a second information layer 43 was formed on the optically separating layer. Specifically, a layer of $TiO_2$ was formed with a thickness of 23 nm as a high refractive index layer 51; a layer of an Ag alloy having the same composition as that of the reflective layer 45 in the first information layer was formed with a thickness of 10 nm as a reflective layer 52; a layer of $ZrO_2$-50 mol % $In_2O_3$ was formed with a thickness of 18 nm as a dielectric layer 53; a layer of $Ge_{43}Bi_4Te_{51}In_2$ was formed with a thickness of 7 nm as a recording layer 55; a layer of $ZrO_2$-50 mol % $Cr_2O_3$ was formed with a thickness of 5 nm as an interface layer 56; and a layer of ZnS-20 mol % $SiO_2$ was formed with a thickness of 40 nm as a dielectric layer 57. These layers were formed in this order by the magnetron sputtering process. Sequentially, a cover layer 44 with a thickness of 0.1 mm was formed of an acrylic resin by the spin coating method. This sample had not interface layers 47 and 54, differently from Sample 1, and the dielectric layer 46 and 53 were formed as the dielectric layers 2b and 2a in the two information layers a and b.

Each of the first information layer and the second information layer was formed using the cluster type sputtering apparatus having seven film-forming chambers shown in FIG. 3, as well as Sample 1. Since the compositions of the respective layers constituting the first information layer were the same as those of the corresponding layers in the second information layer, except for the high refractive index layer 51, the replacement of the targets in the respective film-forming chambers was not needed. Therefore, pre-sputtering was performed for 30 minutes for the high refractive index layer 51 alone, when the apparatus was switched to form the second information layer after the formation of the first information layer. After that, the disc was sampled at every 30 minutes intervals. The layers constituting each of the information layers, the film-forming chambers and the power supply used to form the respective layers, and the need of the replacement of the targets before the formation of the second information layer are shown in Table 4.

of Sample 1 was used. A first information layer 41 was formed on the polycarbonate substrate. Specifically, a layer of an alloy containing 90 at % or more of Al was formed with a thickness of 160 nm as a reflective layer 45; a layer of $ZrO_2$-50 mol % $In_2O_3$ was formed with a thickness of 23 nm as a dielectric layer 46; a layer of $Ge_{43}Bi_4Te_{51}In_2$ was formed with a thickness of 12 nm as a recording layer 48; a layer of $ZrO_2$-50 mol % $Cr_2O_3$ was formed with a thickness of 5 nm as an interface layer 49; and a layer of ZnS-20 mol % $SiO_2$ was formed with a thickness of 60 nm as a dielectric layer 50. These layers were formed in this order by the magnetron sputtering process. Sequentially, an optically separating layer 42 with a thickness of 25 μm was formed on the first information layer 41 according to the same procedures as those employed in Sample 1.

Sequentially, a second information layer 43 was formed on the optically separating layer. Specifically, a layer of $TiO_2$ was formed with a thickness of 23 nm as a high refractive index layer 51; a layer of an Ag alloy containing 90 at % or more of Ag was formed with a thickness of 10 nm as a reflective layer 52; a layer of $ZrO_2$-50 mol % $In_2O_3$ was formed with a thickness of 18 nm as a dielectric layer 53; a layer of $Ge_{43}Bi_4Te_{51}In_2$ was formed with a thickness of 7 nm as a recording layer 55; a layer of $ZrO_2$-50 mol % $Cr_2O_3$ was formed with a thickness of 5 nm as an interface layer 56; and a layer of ZnS-20 mol % $SiO_2$ was formed with a thickness of 40 nm as a dielectric layer 57. These layers were formed in this order by the magnetron sputtering process. Sequentially, a cover layer 44 with a thickness of 0.1 mm was formed of an acrylic resin by the spin coating method. This sample had not interface layers 47 and 54, differently from Sample 1, and the

TABLE 4

| Film Forming Chamber | Power Supply | Composition of First Information Layer 41 | | Replacement of Target | Composition of Second Information Layer 43 | |
|---|---|---|---|---|---|---|
| Film Forming Chamber 38 | DC | | | Not necessary | High Refractive Index Layer 51 | $TiO_2$ |
| Film Forming Chamber 37 | DC | Reflective Layer 45 | Ag Alloy | Not necessary | Reflective Layer 52 | Ag Alloy |
| Film Forming Chamber 36 | RF | Dielectric Layer 46 | $ZrO_2$-50 mol % $In_2O_3$ (=$(ZrO_2)_{50}(In_2O_3)_{50}$) | Not Necessary | Dielectric Layer 53 | $ZrO_2$-50 mol % $In_2O_3$ (=$(ZrO_2)_{50}(In_2O_3)_{50}$) |
| Film Forming Chamber 35 | RF | Interface Layer 47 | (Not Provided) | Not Necessary | Interface Layer 54 | (Not Provided) |
| Film Forming Chamber 34 | DC | Recording Layer 48 | $Ge_{43}Bi_4Te_{51}In_2$ | Not Necessary | Recording Layer 55 | $Ge_{43}Bi_4Te_{51}In_2$ |
| Film Forming Chamber 33 | RF | Interface Layer 49 | $ZrO_2$-50 mol % $Cr_2O_3$ (=$(ZrO_2)_{50}(Cr_2O_3)_{50}$) | Not Necessary | Interface Layer 56 | $ZrO_2$-50 mol % $Cr_2O_3$ (=$(ZrO_2)_{50}(Cr_2O_3)_{50}$) |
| Film Forming Chamber 32 | RF | Dielectric Layer 50 | ZnS-20 mol % $SiO_2$ (=$(ZnS)_{80}(SiO_2)_{20}$) | Not Necessary | Dielectric Layer 57 | ZnS-20 mol % $SiO_2$ (=$(ZnS)_{80}(SiO_2)_{20}$) |

(Sample 5)

A recording medium having a structure similar to the structure shown in FIG. 4 was produced. As a substrate 40, the same polycarbonate substrate as that used for the production dielectric layer 46 and 53 were formed as the dielectric layers 2b and 2a in the two information layers a and b.

Each of the first information layer and the second information layer was formed using the cluster type sputtering apparatus having seven film-forming chambers shown in FIG. 3, as well as Sample 1. Since the compositions of the respective layers constituting the first information layer are the same as those of the corresponding layers in the second information layer, except for the high refractive index layer 51 and the reflective layers, the replacement of the target in the film-forming chamber 37 alone for forming the reflective layers 45 and 52 was needed. The time spent for the replacement of the target was 30 minutes. After that, the film-forming chamber was evacuated in vacuum for 30 minutes, and pre-sputtering was performed for the high refractive index layer 51 and the reflective layer 52 for 30 minutes. After that, the disc was sampled at every 30 minutes intervals. The layers constituting each of the information layers, the film-forming chambers and the power supply used to form the respective layers, and the need of the replacement of the target before the formation of the second information layer are shown in Table 5.

405 nm, and the numerical aperture (NA) was 0.85. The signaling system was (1-7PP) modulation system, and signals were recorded on the groove portion of the substrate at a linear speed of 9.8 m/second. Such recorded signals were reproduced for the measurement of a jitter.

Table 6 shows, regarding each of the recording media of Samples 1 to 5, the time and the transition of the recording margin power of the recording medium after the operation mode of the sputtering apparatus had been switched to the formation of the second information layer from the formation of the first information layer and the target(s) in the predetermined film-forming chamber(s) was replaced. In this regard, the starting point (zero) of the time shown in Table 6 is a

TABLE 5

| Film Forming Chamber | Power Supply | Composition of First Information Layer 41 | | Replacement of Target | Composition of Second Information Layer 43 | |
|---|---|---|---|---|---|---|
| Film Forming Chamber 38 | DC | | | Not necessary | High Refractive Index Layer 51 | $TiO_2$ |
| Film Forming Chamber 37 | DC | Reflective Layer 45 | Al Alloy | Necessary | Reflective Layer 52 | Ag Alloy |
| Film Forming Chamber 36 | RF | Dielectric Layer 46 | $ZrO_2$-50 mol % $In_2O_3$ $(=(ZrO_2)_{50}(In_2O_3)_{50})$ | Not necessary | Dielectric Layer 53 | $ZrO_2$-50 mol % $In_2O_3$ $(=(ZrO_2)_{50}(In_2O_3)_{50})$ |
| Film Forming Chamber 35 | RF | Interface Layer 47 | (Not Provided) | Not necessary | Interface Layer 54 | (Not Provided) |
| Film Forming Chamber 34 | DC | Recording Layer 48 | $Ge_{43}Bi_4Te_{51}In_2$ | Not necessary | Recording Layer 55 | $Ge_{43}Bi_4Te_{51}In_2$ |
| Film Forming Chamber 33 | RF | Interface Layer 49 | $ZrO_2$-50 mol % $Cr_2O_3$ $(=(ZrO_2)_{50}(Cr_2O_3)_{50})$ | Not necessary | Interface Layer 56 | $ZrO_2$-50 mol % $Cr_2O_3$ $(=(ZrO_2)_{50}(Cr_2O_3)_{50})$ |
| Film Forming Chamber 32 | RF | Dielectric Layer 50 | ZnS-20 mol % $SiO_2$ $(=(ZnS)_{80}(SiO_2)_{20})$ | Not necessary | Dielectric Layer 57 | ZnS-20 mol % $SiO_2$ $(=(ZnS)_{80}(SiO_2)_{20})$ |

Regarding each of these five recording media, the recording power margin of the second information a layer of the disc sampled at every 30 minutes intervals after the pre-sputtering was evaluated. Herein, in order to definitely know a time loss in the switching of the sputtering apparatus to the formation of the second information layer from the formation of the first information layer, the time until the characteristics of the second information layer formed after the replacement of the targets satisfied the standards was compared. The criterion for the evaluation thereof was based on the recording power margin. The recording power margin means a recording power margin in which a jitter in reproduction found after 10 times of overwrites was 8.0% or less. When the margin is 15% p-p or more, such a disc was evaluated to satisfy the standards. The wavelength of a laser beam for use in the recording or reproducing of signals on or from these recording media was moment of time when the formation of the first information layer had been completed. As for the disc of Sample 4, the second information layer could be continuously formed immediately after the formation of the first information layer, since the replacement of the targets was not needed. However, pre-sputtering was performed for 30 minutes to avoid any failure, after the start of sputtering of the respective layers of the second information layer, since the layers having the same compositions in the two information layers differed in thickness from each other, and since the high refractive index layer 51 was formed. For this reason, as for Sample 4, the data of the recording power margin from after 0.5 hours were indicated. As for other discs, 30 minutes were spent for each of the replacement of the targets, evacuation in vacuum and the pre-sputtering, and thus, the data of the recording power margin from after 1.5 hours were shown.

TABLE 6

| Time after completion of First Information Layer | Samples | | | | |
|---|---|---|---|---|---|
| | 1 (Comparison) | 2 (Comparison) | 3 (Comparison) | 4 | 5 |
| 0.0 hour | In the midst of replacing target (No data) | In the midst of replacing target (No data) | In the midst of replacing target (No data) | In the midst of presputtering (No data) | In the midst of replacing target (No data) |
| 0.5 hour | In the midst of vacuum evacuation (No data) | In the midst of vacuum evacuation (No data) | In the midst of vacuum evacuation (No data) | 20% | In the midst of vacuum evacuation (No data) |
| 1.0 hour | In the midst of presputtering (No data) | In the midst of presputtering (No data) | In the midst of presputtering (No data) | 20% | In the midst of presputtering (No data) |
| 1.5 hour | 0% | 0% | 0% | 20% | 15% |
| 2.0 hour | 5% | 5% | 10% | 20% | 20% |
| 2.5 hour | 5% | 10% | 15% | 20% | 20% |
| 3.0 hour | 10% | 15% | 15% | 20% | 20% |
| 3.5 hour | 10% | 15% | 20% | 20% | 20% |
| 4.0 hour | 15% | 20% | 20% | 20% | 20% |

The following are known from Table 6.

(1) As for the recording medium of Sample 1 which was produced involving the replacement of three sputtering targets so that the compositions of the dielectric layers 4b and 2b and the recording layer b in the first information layer (or the information layer b) were different from the compositions of the dielectric layers 4a and 2a and the recording layer a in the second information layer (or the information layer a), respectively, a long time was needed to satisfy the required standards after the formation of the first information layer. Specifically, for a time interval between 1.5 hours and 3.5 hours after the formation of the first information layer 41 of Sample 1, the recording power margin was 10% or less, which did not satisfy the standard. Even after 4 hours, the recording power margin of Sample 1 did not reach 20%.

(2) As for the recording medium of Sample 2 which needed the replacement of the target because of the different compositions of the recording layers in the two information layers, the recording power margin for a time interval between 1.5 hours and 2.5 hours after the formation of the first information layer was 10% or less, which did not satisfy the standard.

(3) As for the recording medium of Sample 3 which was produced involving the replacement of two sputtering targets so that the compositions of the dielectric layers 4b and 2b and the recording layer b in the first information layer (or the information layer b) were different from the compositions of the dielectric layers 4a and 2a and the recording layer a in the second information layer (or the information layer a), respectively. The recording power margin for a time interval between 1.5 hours and 2 hours after the formation of the first information layer 41 was 10% or less, which did not satisfy the standard.

(4) As for the recording medium of Sample 4 produced without the replacement of the targets, the recording power margin found after 0.5 hours since the formation of the first information layer reached 20% or more, which resulted in good characteristics.

(5) As for the recording medium of Sample 5 which needed the replacement of the target because of the different compositions of the reflective layers in the two information layers, the recording power margin reached 15% or more after 1.5 hours since the formation of the first information layer, which resulted in good characteristics.

To sum up, the loss time in production, after the change of the operating conditions for the sputtering apparatus (i.e. after the change of the kind of the information layer to be formed), could be reduced to 30 minutes from the maximum 3 hours, by dispensing with the replacement of the targets. On condition that a film-forming tact (or a time necessary for the formation of layers of a single disc) is 10 seconds, a loss time in terms of the number of manufactured discs can be reduced in time equivalent to maximum 900 discs. A production loss can be significantly reduced by forming the first information layer and the second information layer of a recording medium without the replacement of the targets in this way.

When only the target of the film-forming chamber for forming the reflective layer was replaced as in Sample 5, the recording power margin reached 15% immediately after the sampling, which satisfied the standard. In contrast, in case of Sample 1, a long time was needed for the recording power margin to reach 20%. From this fact, the following are known: when the target was replaced in the film-forming chamber for forming the reflective layer, the influence of the residual gas in association with such replacement, on the characteristics of the resultant recording medium was a little, in comparison with the replacement of the targets in the film-forming chambers for forming the recording layer and the dielectric layers (or the interface layers) adjacent thereto, and a loss in production efficiency is also small in comparison therewith. In this regard, in any of Samples, the first and second information layers showed characteristics satisfying the Blu-ray standards after the recording power margin had reached 15% or more.

In Sample 4, the compositions of the respective layers constituting the first information layer were the same as those of the corresponding layers in the second information layer, and thus, the replacement of the targets was not needed, which resulted in a smaller production loss. In Sample 5, the compositions of the recording layer and the dielectric layers (or the interface layers) adjacent thereto, in the first information layer were the same as those of the corresponding layers in the second information layer, and thus, the production loss was relatively small despite the need of the replacement of the targets. This advantage came from the fact that the composition of each of the dielectric layers adjacent to the recording layer (or the interface layer, when the interface layer was laid between the dielectric layer and the recording layer) was limited to a specific one.

(Sample 6 (for Comparison))

A recording medium having the structure shown in FIG. 4 was produced. As a substrate 40, the same polycarbonate substrate as that used for the production of Sample 1 was used. A first information layer 41 was formed on the polycarbonate substrate. Specifically, a layer of an alloy containing 90 at % or more of Ag was formed with a thickness of 80 nm as a reflective layer 45; a layer of ZnS-20 mol % $SiO_2$ was formed with a thickness of 20 nm as a dielectric layer 46; a layer of GeN was formed with a thickness of 5 nm as an interface layer 47; a layer of $Ge_{43}Bi_4Te_{51}In_2$ was formed with a thickness of 12 nm as a recording layer 48; a layer of $ZrO_2$-50 mol % $Cr_2O_3$ was formed with a thickness of 5 nm as an interface layer 49; and a layer of ZnS-20 mol % $SiO_2$ was formed with a thickness of 60 nm as a dielectric layer 50. These layers were formed in this order by the magnetron sputtering process. Sequentially, an optically separating layer 42 with a thickness of 25 µm was formed on the first information layer 41 according to the same procedures as those employed in Sample 1.

Sequentially, a second information layer 43 was formed on the optically separating layer. Specifically, a layer of $TiO_2$ was formed with a thickness of 23 nm as a high refractive index layer 51; a layer of an Ag alloy having the same composition as that of the reflective layer 45 in the first information layer was formed with a thickness of 10 nm as a reflective layer 52; a layer of ZnS-20 mol % $SiO_2$ was formed with a thickness of 13 nm as a dielectric layer 53; a layer of GeN was formed with a thickness of 5 nm as an interface layer 54; a layer of $Ge_{43}Bi_4Te_{51}In_2$ was formed with a thickness of 7 nm as a recording layer 55; a layer of $ZrO_2$-50 mol % $Cr_2O_3$ was formed with a thickness of 5 nm as an interface layer 56; and a layer of ZnS-20 mol % $SiO_2$ was formed with a thickness of 40 nm as a dielectric layer 57. These layers were formed in this order by the magnetron sputtering process. Sequentially, a cover layer 44 with a thickness of 0.1 mm was formed of an acrylic resin by the spin coating method.

Each of the first information layer and the second information layer was formed using the cluster type sputtering apparatus having seven film-forming chambers shown in FIG. 3, as well as Sample 1. Since the compositions of the respective layers constituting the first information layer are the same as those of the corresponding layers in the second information layer, except for the high refractive index layer 51, the replacement of the targets in the respective film-forming chambers was not needed. Therefore, pre-sputtering was carried out for 30 minutes for the high refractive index layer 51 alone, when the apparatus was switched to form the second information layer after the formation of the first information layer. After that, the disc was sampled at every 30 minutes intervals. The layers constituting each of the information layers, the film-forming chambers and the power supply used to form the respective layers, and the need of the replacement of the targets before the formation of the second information layer are shown in Table 7.

TABLE 7

| Film Forming Chamber | Power Supply | Composition of First Information Layer 41 | | Replacement of Target | Composition of Second Information Layer 43 | |
|---|---|---|---|---|---|---|
| Film Forming Chamber 38 | DC | | | Not necessary | High Refractive Index Layer 51 | $TiO_2$ |
| Film Forming Chamber 37 | DC | Reflective Layer 45 | Ag Alloy | Not necessary | Reflective Layer 52 | Ag Alloy |
| Film Forming Chamber 36 | RF | Dielectric Layer 46 | ZnS-20 mol % $SiO_2$ (=$(ZnS)_{80}(SiO_2)_{20}$) | Not necessary | Dielectric Layer 53 | ZnS-20 mol % $SiO_2$ (=$(ZnS)_{80}(SiO_2)_{20}$) |
| Film Forming Chamber 35 | RF | Interface Layer 47 | GeN | Not necessary | Interface Layer 54 | GeN |
| Film Forming Chamber 34 | DC | Recording Layer 48 | $Ge_{43}Bi_4Te_{51}In_2$ | Not necessary | Recording Layer 55 | $Ge_{43}Bi_4Te_{51}In_2$ |
| Film Forming Chamber 33 | RF | Interface Layer 49 | $ZrO_2$-50 mol % $Cr_2O_3$ (=$(ZrO_2)_{50}(Cr_2O_3)_{50}$) | Not necessary | Interface Layer 56 | $ZrO_2$-50 mol % $Cr_{2O3}$ (=$(ZrO_2)_{50}(Cr_2O_3)_{50}$) |
| Film Forming Chamber 32 | RF | Dielectric Layer 50 | ZnS-20 mol % $SiO_2$ (=$(ZnS)_{80}(SiO_2)_{20}$) | Not necessary | Dielectric Layer 57 | ZnS-20 mol % $SiO_2$ (=$(ZnS)_{80}(SiO_2)_{20}$) |

The initial characteristics and life characteristics of the recording medium of Sample 6 were compared with those of Sample 4. The initial characteristics were evaluated from the recording power margin and the bottom jitter. The recording power margin indicates a recording power margin at which a reproduction jitter found after 10 times of overwrites is 8.0% or less for the second information layer and is 6.0% or less for the first information layer. A recording medium of which this margin is 15% p-p or more is regarded as having initial characteristics necessary for practical use. The bottom jitter was defined as a bottom value of the reproduction jitter after 10 times of overwrites. A laser beam with a wavelength of 405 nm and a numerical aperture (NA) of 0.85 was used to measure the recording power margin and the bottom jitter. The signaling system was (1-7PP) modulation system, and signals were recorded on the groove portion of the substrate. The initial characteristics were measured when signals were recorded at linear speeds of 4.9 m/second and 9.8 m/second, respectively.

The life characteristics were measured under the same conditions as those for the evaluation of the initial characteristics, as follows: after the environmental test (90° C., 20% RH, 24 hours) of the initially recorded signal, the read characteristics (or the archival characteristics) of the signal, and the read characteristics (or the archival overwrite characteristics) of a signal overwritten on the above signal were measured with respect to the first and second information layers, respectively. Also, the life characteristics were evaluated, when signals were recorded at linear speeds of 4.9 m/second and 9.8 m/second respectively. Either of the archival characteristics and the archival overwrite characteristics were marked with ◯ when a rate of increase in jitter value relative to the initial jitter was 2% or less, and were marked with X, when the same rate exceeded 2%. The results are shown in table 8.

result was obtained when each of the recording layers a and b contained $Ge_{45}Sn_1Sb_4Te_{50}$ (at %) or $Ge_{43}Bi_4Te_{51}Ga_2$ (at %).

Both the dielectric layers 2a and 2b (or the dielectric layers 46 and 53) of each of Samples 4 and 5 were formed as layers containing $ZrO_2$—$In_2O_3$. The dielectric layers 2a and 2b may have other composition such as a composition containing at least one oxide selected from $SiO_2$, $Cr_2O_3$, $Ga_2O_3$, $HfO_2$, $ZrO_2$ and $In_2O_3$. In concrete, a similar result was obtained when the interface layers 2a and 2b contained $ZrO_2$-25 mol % $SiO_2$-50 mol % $In_2O_3$, $ZrO_2$-50 mol % $Ga_2O_3$, $ZrO_2$-30 mol % $In_2O_3$-40 mol % $Cr_2O_3$ or $HfO_2$-30 mol % $SiO_2$-40 mol % $Cr_2O_3$.

Both the reflective layers a and b of each of Samples 4 and 5 were formed as layers of Ag alloys. The reflective layers a and b may be formed of other material. Specifically, a similar result was obtained when the reflective layers a and b were formed of an Al—Cr alloy, an Ag—Ga—Cu alloy or an

TABLE 8

| | | | Sample 4 | | Sample 6 | |
|---|---|---|---|---|---|---|
| | | | First Information Layer | Second Information Layer | First Information Layer | Second Information Layer |
| Linear Speed 4.9 m/s | Initial | Power Margin | 20% | 20% | 20% | 20% |
| | | Bottom Jitter | 5.2% | 7.1% | 5.3% | 7.3% |
| | Life | Archival Characteristics | ◯ | ◯ | X | X |
| | | Archival Overwrite Characteristics | ◯ | ◯ | ◯ | ◯ |
| Linear Speed 9.8 m/s | Initial | Power Margin | 20% | 20% | 20% | 20% |
| | | Bottom Jitter | 5.7% | 7.5% | 5.6% | 7.5% |
| | Life | Archival Characteristics | ◯ | ◯ | ◯ | ◯ |
| | | Archival Overwrite Characteristics | ◯ | ◯ | X | X |

In both Samples 4 and 6, the initial characteristics were good at each of the linear speeds. However, Sample 6 was inferior in life characteristics compared to Sample 4, and was inferior particularly in archival characteristics at a low linear speed and in archival overwrite characteristics at a high linear speed compared to Sample 4. This was because, in Sample 6, the material for the dielectric layer 1 (or the interface layer 47 or 54) distant from the laser beam incoming side was GeN which contained no oxide of a specific element.

In the above Example, the dielectric layers 1a and 1b of each of Samples 4 and 5 equivalent to the recording media of the present invention were formed of $ZrO_2$-50 mol % $Cr_2O_3$. The dielectric layers 1a and 1b may be formed of a material having other composition: for example, such a material may have a composition containing at least one oxide, nitride or fluoride selected from $Al_2O_3$, $SiO_2$, $Ta_2O_5$, Mo—O, $WO_3$, $ZrO_2$, $HfO_2$, Al—N, B—N, Ge—N, Si—N, Ti—N, Zr—N, $DyF_3$, $ErF_3$, $EuF_3$, $CeF_3$, $BiF_3$ and $LaF_3$. In particular, a similar result was obtained when the dielectric layers 1a and 1b contained $Ta_2O_5$-50 mol % $SiO_2$, $HfO_2$-30 mol % $SiO_2$-40 mol % $Cr_2O_3$, AlN-50 mol % $SnO_2$, $ZrO_2$-20 mol % $SiO_2$-30 mol % $Cr_2O_3$-20 mol % $LaF_3$ or $CeF_3$-80 mol % $In_2O_3$.

Both the recording layers a and b of each of Samples 4 and 5 were formed of a GeBiTeIn material. Each of the recording layers a and b, or may be formed of other material containing Ge and Te as main components (preferably total 82 at. % or more) and further containing at least one element selected from Sn, Ag, Sb, Ga, Al, Bi and In. Specifically, a similar Ag—Pd—Cu alloy, containing, as a main component (90 at % or more), at least one element selected from Ag, Al and Au.

The high refractive index layer of each of Samples 4 and 5 was formed as a layer of an oxide of Ti. The high refractive index layer may be formed of other material. Specifically, a similar result was obtained when the high refractive index layer was formed of a material containing, as a main component, at least one oxide selected from $TiO_2$ and $Nb_2O_5$, such as $TiO_2$-10 mol % $SiO_2$ or $TiO_2$-50 mol % $Nb_2O_5$. Depending on the structure of the recording medium, it may not be needed to include the high refractive index layer. A similar result was obtained also for such a recording medium.

Each of the two information layers of each of Samples 4 and 5 had the interface layers 49 and 56. The dielectric layers 50 and 57 may be formed as the dielectric layers 1b and 1a each adjacent to the recording layer, without both the interface layers. Specifically, a similar result was obtained when the dielectric layers 1b and 1a were formed so that the layers 1b and 1a had the composition containing a specified oxide, nitride or fluoride as listed above in relation to the interface layers 49 and 56. Otherwise, only the interface layer 56 may be provided, and the layer 56 may be formed so that it has the same composition as the composition of the dielectric layer 50. Or otherwise, only the interface layer 49 may be provided, and the layer 49 may be formed so that it had the same composition as the composition of the dielectric layer 57.

The two information layers of each of Samples 4 and 5 had not the interface layers 47 and 54, respectively, and the dielectric layers 46 and 53 were formed as the dielectric layers 2a and 2b each adjacent to the recording layer, respectively. A similar result was obtained for a recording medium in which these interface layers 47 and 54 were formed as the dielectric layers 2a and 2b, respectively, and in which the dielectric layers 46 and 53 were formed as the dielectric layers 3a and 3b, respectively. Alternatively, only the interface layer 47 may be provided, and the layer 47 may be formed of a material of the same composition as the composition of the dielectric layer 53. Alternatively, only the interface layer 54 may be provided, and the composition of the layer 54 may be the same as that of the dielectric layer 46.

INDUSTRIAL APPLICABILITY

The information recording medium of the present invention and the method for producing the same are useful for the production of multi-layer single-sided optical discs such as double-layer single-sided Blu-ray discs (rewritable type and write-once type), four-layer single-sided discs (rewritable type and write-once type), etc. in view of improvement on the productivity and reduction of the cost. The information recording medium of the present invention and the method for producing the same are also useful for the production of double-layer single-sided DVD-RW, DVD+RW and DVD-RAM.

The invention claimed is:

1. An information recording medium comprising at least two information layers each having a recording layer which can generate optically detectable phase-change, wherein one information layer near a light incoming side is referred to as an information layer a, and the other information layer distant from the light incoming side as an information layer b, wherein:
said information layer a comprises, at least, a dielectric layer 1a, a recording layer a, a dielectric layer 2a and a reflective layer a in this order from the light incoming side; and said information layer b comprises, at least, a dielectric layer 1b, a recording layer b, a dielectric layer 2b and a reflective layer b in this order from the light incoming side,
said dielectric layers 1a and 2a are in contact with the recording layer a; and said dielectric layers 1b and 2b are in contact with the recording layer b,
each of said dielectric layer 1a and said dielectric layer 1b contains at least one atom selected from an oxygen atom, a nitrogen atom and a fluorine atom, provided that each of said dielectric layers 1a and 1b contains at least one element selected from Al, Si, Cr, Ta, Mo, W, Zr and Hf, when containing an oxygen atom, or contains at least one element selected from Al, B, Ge, Si, Ti and Zr, when containing a nitrogen atom, or contains at least one element selected from Dy, Er, Eu, Ce, Bi and La, when containing a fluorine atom,
each of said dielectric layers 2a and 2b contains at least one element selected from Zr, Si, Cr, In, Ga and Hf, and an oxygen atom,
a composition of said dielectric layer 1a is the same as a composition of said dielectric layer 1b; a composition of said recording layer a is the same as a composition of said recording layer b; and a composition of said dielectric layer 2a is the same as a composition of said dielectric layer 2b, and
each of said recording layers a and b comprises a Ge—Bi—Te—M''-based material represented by the following formula (11):

$$Ge_aBi_bTe_dM''_{100-a-b-d} \text{ (at\%)} \quad (11)$$

wherein M'' represents at least one element selected from Al, Ga and In; and a, b and d satisfy the relationships of $25 \leq a \leq 60$, $0 < b \leq 18$, $35 \leq d \leq 55$, and $82 \leq a+b+d < 100$.

2. The information recording medium according to claim 1, wherein each of said dielectric layers 1a and 1b contains at least one compound selected from oxides of Al, Si, Cr, Ta, Mo, W, Zr and Hf, nitrides of Al, B, Ge, Si, Ti and Zr, and fluorides of Dy, Er, Eu, Ce, Bi and La, and each of said dielectric layers 2a and 2b contains at least one compound selected from oxides of Zr, Si, Cr, In, Ga and Hf.

3. The information recording medium according to claim 1, wherein a composition of said reflective layer a is the same as a composition of said reflective layer b.

4. The information recording medium according to claim 3, wherein a thickness of said reflective layer a is smaller than a thickness of said reflective layer b.

5. The information recording medium according to claim 3, wherein each of said reflective layers a and b contains 90 at % or more of at least one element selected from Ag, Al and Au.

6. The information recording medium according to claim 1, wherein, in at least one combination selected from a combination of said dielectric layers 1a and 1b, a combination of said recording layers a and b and a combination of said dielectric layers 2a and 2b, the layers differ in thickness from each other.

7. The information recording medium according to claim 1, wherein a thickness of said recording layer a is smaller than a thickness of said recording layer b.

8. The information recording medium according to claim 1, which further comprises a dielectric layer 3a which is in contact with a surface of said dielectric layer 1a opposite the other surface of said dielectric layer 1a in contact with said recording layer a;
and a dielectric layer 3b which is in contact with a surface of said dielectric layer 1b opposite the other surface of said dielectric layer 1b in contact with said recording layer b, wherein a composition of said dielectric layer 3a is the same as a composition of said dielectric layer 3b.

9. The information recording medium according to claim 1, wherein said information layer a further includes a high refractive index layer a, and said dielectric layer 2a, said reflective layer a and said high refractive index layer a are disposed in this order from the light incoming side, and wherein the following relationships are satisfied, provided that a refractive index of said dielectric layer 1a is n1a, a refractive index of said dielectric layer 2a is n2a, and a refractive index of said high refractive index layer is n3a:
n1a<n3a, and n2a<n3a.

10. The information recording medium according to claim 9, wherein said high refractive index layer, preferably, contains at least one element selected from Ti and Nb, and either or both of an oxygen atom and a nitrogen atom.

11. The information recording medium according to claim 1, wherein each of said recording layers a and b further contains at least one element selected from In, Bi, Sn, Ag, and Sb.

12. The information recording medium according to claim 1, wherein the number of said information layers is 2.

13. The information recording medium according to claim 1, wherein said information layer a is directly continued from said information layer b.

14. A method for producing a information recording medium which comprises at least two information layers each having a recording layer which can generate optically detectable phase change, wherein, when one information layer near a light incoming side is referred to as an information layer a, and the other information layer distant from the light incoming side, as an information layer b, said information layer a comprises, at least, a dielectric layer 1a, a recording layer a, a dielectric layer 2a and a reflective layer a in this order from the light incoming side; and said information layer b comprises, at least, a dielectric layer 1b, a recording layer b, a dielectric layer 2b and a reflective layer b in this order from the light incoming side, said dielectric layers 1a and 2a are in contact with the recording layer a; and said dielectric layers 1b and 2b are in contact with the recording layer b, each of said dielectric layer 1a and said dielectric layer 1b contains at least one atom selected from an oxygen atom, a nitrogen atom and a fluorine atom, provided that each of said layers 1a and 1b contains at least one element selected from Al, Si, Cr, Ta, Mo, W, Zr and Hf, when containing an oxygen atom, or contains at least one element selected from Al, B, Ge, Si, Ti and Zr, when containing a nitrogen atom, or contains at least one element selected from Dy, Er, Eu, Ce, Bi and La, when containing a fluorine atom, each of said dielectric layers 2a and 2b contains at least one element selected from Zr, Si, Cr, In, Ga and Hf, and an oxygen atom, and a composition of said dielectric layer 1a is the same as a composition of said dielectric layer 1b; a composition of said recording layer a is the same as a composition of said recording layer b; and a composition of said dielectric layer 2a is the same as a composition of said dielectric layer 2b, and each of said recording layers a and b comprises a Ge—Bi—Te—M"-based material represented by the following formula (11):

$$Ge_a Bi_b Te_d M''_{100-a-b-d} \text{ (at \%)} \qquad (11)$$

wherein M" represents at least one element selected from Al, Ga and In and a, b and d satisfy the relationships of $25 \leq a \leq 60$, $0 < b \leq 18$, $35 \leq d \leq 55$, and $82 \leq a+b+d < 100$, said method comprising:

forming said dielectric layer 1a, said recording layer a and said dielectric layer 2a, and said dielectric layer 1b, said recording layer b and said dielectric layer 2b, by any one method selected from a sputtering process, a vapor deposition process and a CVD process, wherein, said dielectric layers 1a and 1b are formed, using a target having the same composition, said recording layers a and b are formed using a target having the same composition, and said dielectric layers 2a and 2b are formed using a target having the same composition.

15. The method according to claim 14, wherein said reflective layers a and b are formed, using a target having the same composition.

16. The method according to claim 14, wherein said information layer b is formed immediately after formation of said information layer a so that said information layers a and b are continuous.

* * * * *